(12) United States Patent
Arakawa

(10) Patent No.: US 7,538,895 B2
(45) Date of Patent: May 26, 2009

(54) IMAGE PROCESSING APPARATUS, METHOD FOR CONTROLLING IMAGE PROCESSING APPARATUS AND IMAGE PROCESSING SYSTEM

(75) Inventor: Naoto Arakawa, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 670 days.

(21) Appl. No.: 09/924,725

(22) Filed: Aug. 9, 2001

(65) Prior Publication Data

US 2002/0054339 A1    May 9, 2002

(30) Foreign Application Priority Data

Aug. 11, 2000  (JP) ............................. 2000-243721
Jul. 19, 2001  (JP) ............................. 2001-218974

(51) Int. Cl.
*G06F 3/12*   (2006.01)
*G06K 15/00*  (2006.01)
*H04N 1/04*   (2006.01)
*B42C 11/06*  (2006.01)
*B42C 11/04*  (2006.01)

(52) U.S. Cl. ..................... 358/1.13; 358/1.16; 358/505; 358/474; 412/4; 412/19

(58) Field of Classification Search ............... 358/1.13, 358/1.15, 1.16, 505, 474; 700/26, 27; 412/4, 412/19
See application file for complete search history.

(56) References Cited

U.S. PATENT DOCUMENTS 5,124,731 A  *  6/1992  Knodt et al. ................. 347/129
6,151,131 A  *  11/2000  Pepin et al. ................. 358/1.13

* cited by examiner

*Primary Examiner*—Edward L Coles
*Assistant Examiner*—Thomas J Lett
(74) *Attorney, Agent, or Firm*—Fitzpatrick, Cella, Harper & Scinto

(57) ABSTRACT

The present invention provides an image processing apparatus having storing means for storing the print data requested from an information processing apparatus, comprising an input device for inputting designation information for arranging plural image originals read by a scanner device in different predetermined positions of the print data, respectively, and a print processing device for effecting print processing of the print data and the read plural image originals on the basis of the information inputted by the input device.

15 Claims, 20 Drawing Sheets

FIG. 10

PRINTER

SERVER : ABCDEFG

USER ID : XXXXXXX  ( CHECK ID )

DOCUMENT NAME : TEST0024       BT2

PAPER SIZE : [ A4  ↓ ]

COPIES : [      10 ]

PRINT AREA : (●) ALL
             ( ) FROM [   ] TO [   ]

JOB SPOOL TYPE
   ( ) PRINT TYPE   (●) SERVER SPOOL TYPE ( CANCEL )   ( PRINT )
                 BT1

FIG. 11

| JOB NO. | DOCUMENT NAME | PAGES | USER ID |
|---|---|---|---|
| 241 | TESTDOC1003 | 10 | 002727 |
| 243 | YAMAKADOC | 20 | 003622 |
| 244 | DOC-9869 | 10 | 000021 |
| 245 | DMYDOC001 | 18 | 000257 |
| 250 | DMYDOC002 | 15 | 000257 |
| 251 | DMYDOC003 | 12 | 000257 |
| 252 | DOC-3333 | 66 | 000525 |
| 253 | TESTDOC1004 | 24 | 002727 |

INSERT/OVERLAY ORIGINAL 〈JOB SELECTION〉

CANCEL   OK — BT11

FIG. 12

INSERT/OVERLAY ORIGINAL :  ⟨TYPE SETTING⟩

JOB NO. : 244
DOCUMENT NAME : DOC-9869
PAGES : 10
USER ID : 000021

PLEASE SELECT TYPE :

● ORIGINAL 1 PAGE, FRONT COVER INSERT
○ ORIGINAL 2 PAGES, FRONT/BACK COVER INSERT
○ ORIGINAL 3 PAGES, FRONT/BACK COVER INSERT, MIDDLE OVERLAY
○ ORIGINAL 4 PAGES, FRONT/BACK COVER REVERSE INSERT

DELETE JOB AFTER EXECUTION — BT12

CANCEL    OK — BT13

FIG. 20

MEMORY MAP OF MEM MEDIUM (FD/CD-ROM)

| DIRECTORY |
|---|
| 1ST DATA PROCESSING PROGRAM<br>PROGRAM CODES FOR FLOWCHART<br>OF FIGS. 14 TO 16 |
| 2ND DATA PROCESSING PROGRAM<br>PROGRAM CODES FOR FLOWCHART<br>OF FIG. 17 |
| 3RD DATA PROCESSING PROGRAM<br>PROGRAM CODES FOR FLOWCHART<br>OF FIG. 18 |
| 4TH DATA PROCESSING PROGRAM<br>PROGRAM CODES FOR FLOWCHART<br>OF FIG. 19 |
| |

IMAGE PROCESSING APPARATUS, METHOD FOR CONTROLLING IMAGE PROCESSING APPARATUS AND IMAGE PROCESSING SYSTEM

BACKGROUND OF THE INVENTION

1. Field of the Invention

The present invention relates to an image processing apparatus in which predetermined processing is performed on the basis of image information to be printed or copied so that an image is formed on a sheet, and a method for controlling such an image processing apparatus.

2. Related Background Art

In conventional image processing apparatuses for effecting predetermined image processing, in order to obtain image processing result (print processing result) with front/back cover and reverse different for applications with respect to certain print data, it was required that image data of original such as front/back cover is previously prepared on document data of application software operating in an information processing apparatus for forming print data to be sent to the image processing apparatus and the image data be added to the print data, and all image data be reprinted each time and be developed to bit map data.

Further, in recent years, there has been proposed a box print function in which print data formed in the information processing apparatus is stored in a memory of the image processing apparatus for effecting print output and the print data is read out from the memory on the basis of instruction from an operation panel and is print-processed.

In the above-mentioned conventional back ground art, in order that the user obtains the print result with desired front/back cover added, an operation for reading the front cover and the like by means of a scanner and for inputting the read data to the information processing apparatus and for adding the inputted image data to the document data, processing for forming the document data on the application software, and print data forming processing for forming the print data on a printer driver on the basis of the document data to which the image data was added must be performed.

Thus, in order to obtain the print result in which the desired front/back cover image-inputted is added to the print data, the user must perform the above operations each time, with the result that the operating burden is increased and convenience is worsened.

Further, after the print data was sent from the information processing apparatus to the image processing apparatus by utilizing the box print function, the image data read by the scanner cannot be designated as the front cover, and, thus, the read image data must be added again to form the print data in the information processing apparatus.

SUMMARY OF THE INVENTION

The present invention aims to solve the above-mentioned problem, and a first object of the present invention is to provide image processing apparatus and method, in which image information corresponding to plural pages read by a scanner device is inserted into plural predetermined positions of print data which is desired to be printed by the user, thereby easily obtaining a desired print result. The image processing apparatus having storing means for storing the print data requested from an information processing apparatus is characterized by input means for inputting designated information for arranging plural image originals read by the scanner device in the different predetermined positions of the print data, respectively, and print processing means for effecting print processing of the print data and the read plural image originals on the basis of the information inputted by the input means.

A second object of the present invention is to provide image processing apparatus and method, in which, when print data spooled in a memory by utilizing a box print function is print-instructed at any timing, original information read by a scanner device can easily be inserted into a predetermined position thereby to easily obtain a desired print result. The image processing apparatus having storing means for storing the print data requested from an information processing apparatus is characterized by first input means for inputting information for designating print data to be print-processed among the print data stored in the storing means, second input means for inputting information for designating and arranging an image original read by the scanner device in a predetermined position of the print data, and print processing means for effecting print processing of the designated print data and the read plural image originals on the basis of the information inputted by the first and second input means.

BRIEF DESCRIPTION OF THE DRAWINGS

FIG. 10 is a view showing an example of a printer dialog sent and received between the client computer and a display device shown in FIG. 1;

FIG. 11 is a view showing an example of an operation view (picture plane) displayed on an operation panel of the digital color copier shown in FIG. 1;

FIG. 12 is a view showing an example of an operation picture plane displayed on an operation panel of the digital color copier shown in FIG. 1;

FIG. 20 is a view for explaining a memory map of a recording medium for storing various data processing programs readable by the image processing system according to the present invention.

DESCRIPTION OF THE PREFERRED EMBODIMENTS

The present invention will now be fully explained in connection with embodiments thereof.

Figure 1:
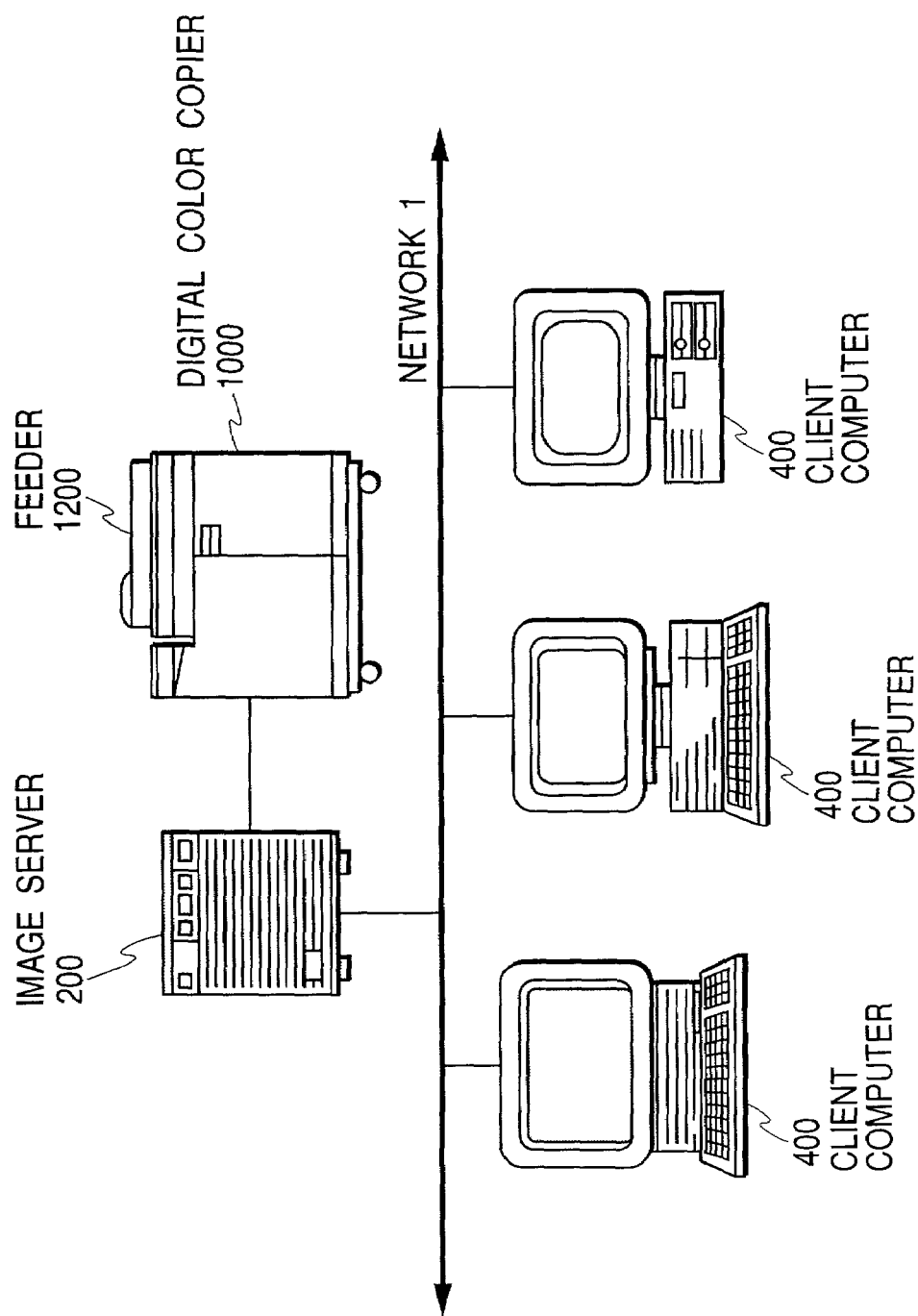
FIG. 1 is a view for explaining a construction of an image processing system to which a server device and an image processing apparatus can be applied, according to a first embodiment of the present invention.

FIG. 1 is a view for explaining a construction of an image processing system to which an image processing apparatus according to the present invention is applied.

In FIG. 1, the image processing system is constituted by a digital color copier 1000 as an image processing apparatus comprised of an upper digital color image reading portion (referred to as "color scanner" hereinafter) 100 (FIG. 2), a circulating type reflection original feeding device (referred to as "feeder" hereinafter) 1200 for setting an original on the color scanner 100 and a digital color image printing portion (referred to as "color printer" hereinafter) 300 (FIG. 2) for printing out a digital color image, an image server 200 as a server device connected on a network, other plural image servers having the same construction, and computers 400 as information processing apparatuses which are used by client users.

Figure 2:
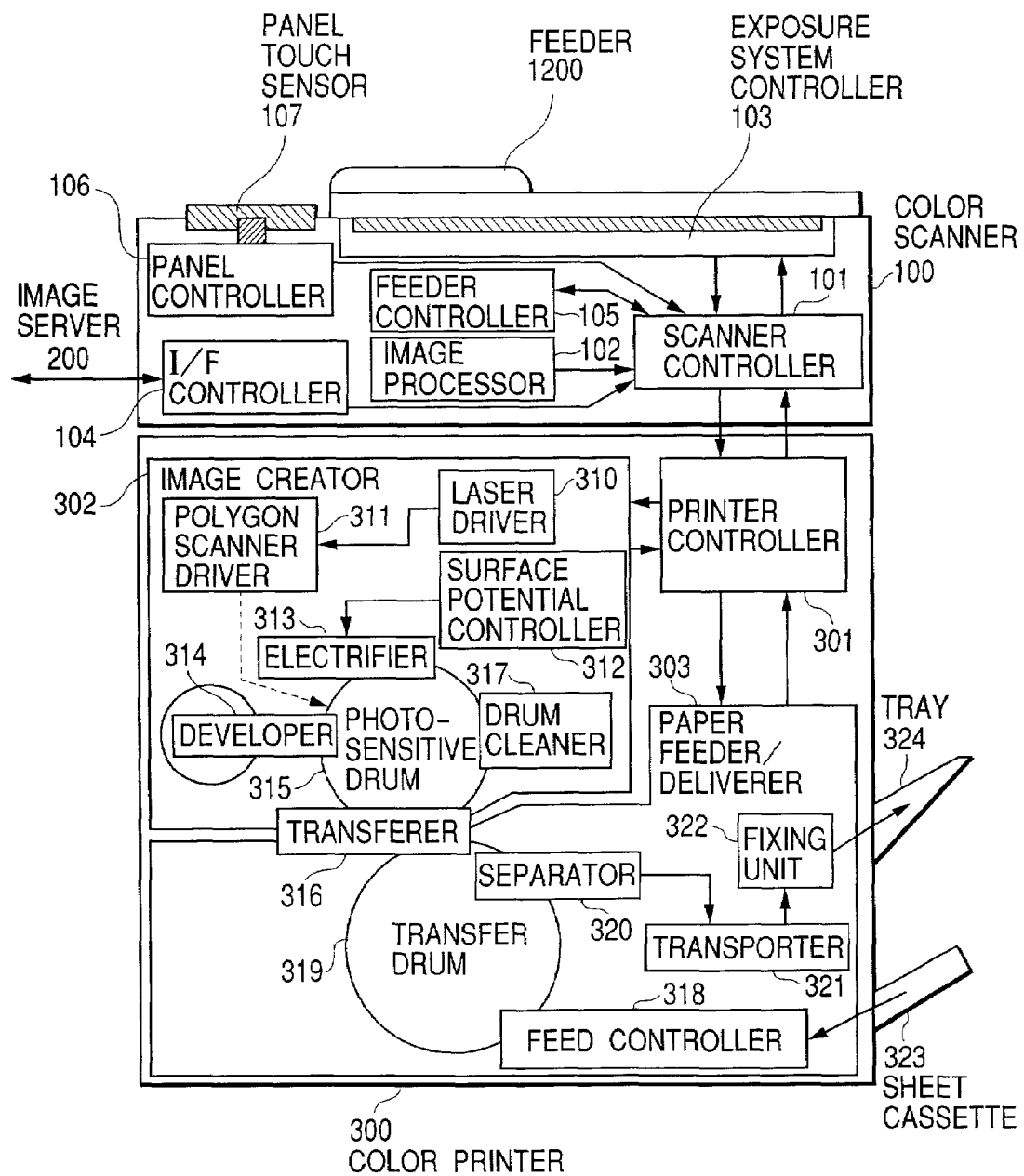
FIG. 2 is a view for explaining a schematic construction of a digital color copier shown in FIG. 1.

FIG. 2 is a view for explaining a schematic construction of the digital color copier 1000 suitable as the image processing apparatus according to the present invention shown in FIG. 1.

The color scanner 100 shown in FIG. 2 includes a scanner controller 101 which controls communication with a printer controller 301 of the color printer 300 and a scanner sequence.

The scanner controller 101 controls in such a manner that an exposure system controller 103 color-decomposes an original on an original platen into red (R), green (G) and blue (B) colors by a CCD line sensor of closed contact type and converts them into point-successive analogue image signals.

The analogue image signals are converted into respective color 8-bit digital image signals in an A/D converting portion, and the respective R, G, B colors (luminance) are outputted as line-successive signals. The image signals (digital) are converted from luminance levels of R, G, B into levels corresponding to toner amounts of four colors (C (cyan), M (magenta), Y (yellow) and K (black)) as density in an image processor 102 for effecting predetermined image processing.

At the same time, in the image processor 102, color correction calculation is effected, and various image processing operations such as composition, change in magnification and shifting are performed.

Further, in the image processor 102, calculation processing of data reflected from the original and the print data from the image server 200 synchronous with the original data can be performed to compose or combine the reflection original data at luminance levels of R, G, B with the print data.

An operation panel controller 106 serves to control an operation panel touch sensor 107 having functions both as an operation panel as a display portion for displaying message and as a touch sensor for instructing the operation.

An interface (I/F) controller 104 serves to control communication with the image server 200. Incidentally, an original transporting condition of the feeder 1200 is controlled by a feeder controller 105.

An image creator 302 of the color printer 300 includes a laser driver 310. The digital image signals of C, Y, M and K sent from the color scanner 100 are converted into lighting signals for a semiconductor laser, and the lighting signals are outputted to a polygon scanner driver 311 as pulse widths corresponding to the levels of the digital image signals.

An electrifier 313 serves to electrify a surface of a photosensitive drum 315 in accordance with instruction from a surface potential controller 312. A drum cleaner 317 serves to collect residual toner from the surface of the photosensitive drum 315 after transferring.

A paper feeder/deliverer 303 of the printer 300 includes a transfer drum 319 where a recording sheet fed from a sheet cassette 323 in response to instruction from a feed controller 318 is transferred or separated. A separator 320 serves to separate the recording sheet to which a toner image was transferred in a transferer 316 from the transfer drum 319.

Incidentally, the lighting levels of the laser are 256 levels (corresponding to 8-bit). In accordance with the digital image signals to be outputted, the color images are limited to every colors C, M, Y and K, and exposure of digital dot type is effected on the photosensitive drum 315, thereby forming latent images successively. Thereafter, the latent images are successively developed in a developer 314 and are transferred onto the sheet successively. Lastly, after the images are fixed to the sheet in a fixing unit 322, the sheet is discharged onto a tray 324. Further, the developer 314 is designed so that the color toner images of C, Y, M and K can be developed successively.

Further, when functioned as the digital color copier 1000, the image original is set on the original platen of the color scanner 100, and, by pressing a copy start key displayed on the operation panel, the image from the color scanner is read in accordance with the aforementioned process, and, by effecting the image processing, and exposure, development, transferring and fixing in the color printer 300, the image is formed and is outputted as the color copy.

Figure 3:
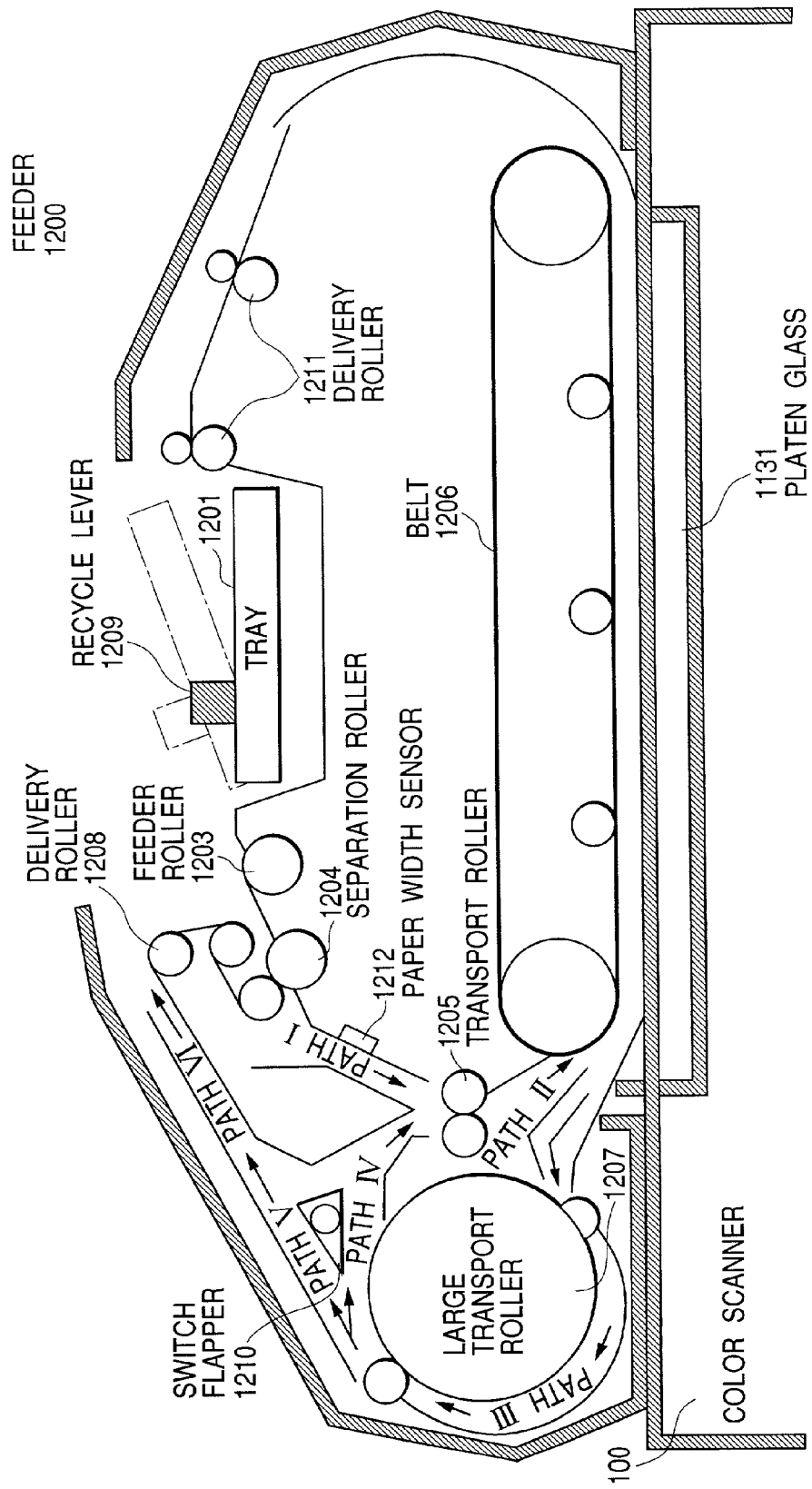
FIG. 3 is a sectional view for explaining a detailed construction of a feeder shown in FIG. 2.

FIG. 3 is a sectional view for explaining a detailed construction of the feeder 1200 shown in FIG. 2. The feeder 1200 is arranged above the original platen of the color scanner and is controlled by the feeder controller 105 of the color scanner 100.

Further, a stacking tray 1201 for stacking the originals is provided with guide members (not shown) for regulating a width-wise direction of the original to prevent skew-feeding of the original during the original feeding. The guide members can be slid in directions perpendicular to an original feeding direction. A slide volume (not shown) is also operated in synchronous with the guide members, thereby detecting a width-wise size of the original.

In the feeder 1200 shown in FIG. 3, regarding a one-face original, a lowermost original among the originals stacked on the stacking tray 1201 is separated and fed by a feeder roller 1203 and a separation roller 1204. A paper width (in the feeding direction) of the fed original is detected by a paper width sensor of close contact type provided in a path I while the original is being passed through the path I, and then, the original is passed through a path II by transport rollers 1205 and a belt 1206 to reach an exposure position on a platen glass 1131 and then is stopped there.

After the scanning of the original is finished, the original on the platen glass 1131 is returned again on the top of the original stack by a large transport roller 1207 and a delivery roller 1208.

Incidentally, in case of small size original, the original is returned again on the top of the original stack by the belt and delivery rollers 1211.

In this case, a recycle lever 1209 is rested on the original stack upon initiation of the original feeding, so that, when the originals are successively fed and a trailing end of the last original leaves the recycle lever 1209, the dropping of the recycle lever 1209 onto the stacking tray 1201 is detected, thereby recognizing one circulation of originals.

In case of a both-face original, after the scanning is finished as mentioned above, the original is passed through a path III and, by switching a rotatable switch flapper 1210, a leading end of the original is directed into a path IV. Then, the original is passed through the path II by the transport rollers 1205, and the original is set on the platen glass 1131 by the belt 1206.

The is to say, by the rotation of the large transport roller 1207, the original is reversed (turned up) in the paths III, IV and II.

Further, by passing the originals one by one through the paths I, II, III, V and VI and transporting the original until one circulation of the originals are recognized by the recycle lever 1209, count means for counting number of originals is constituted by the paper width sensor 1212. With this arrangement, it is possible to judge whether the originals are odd pages or even pages.

Figure 4:
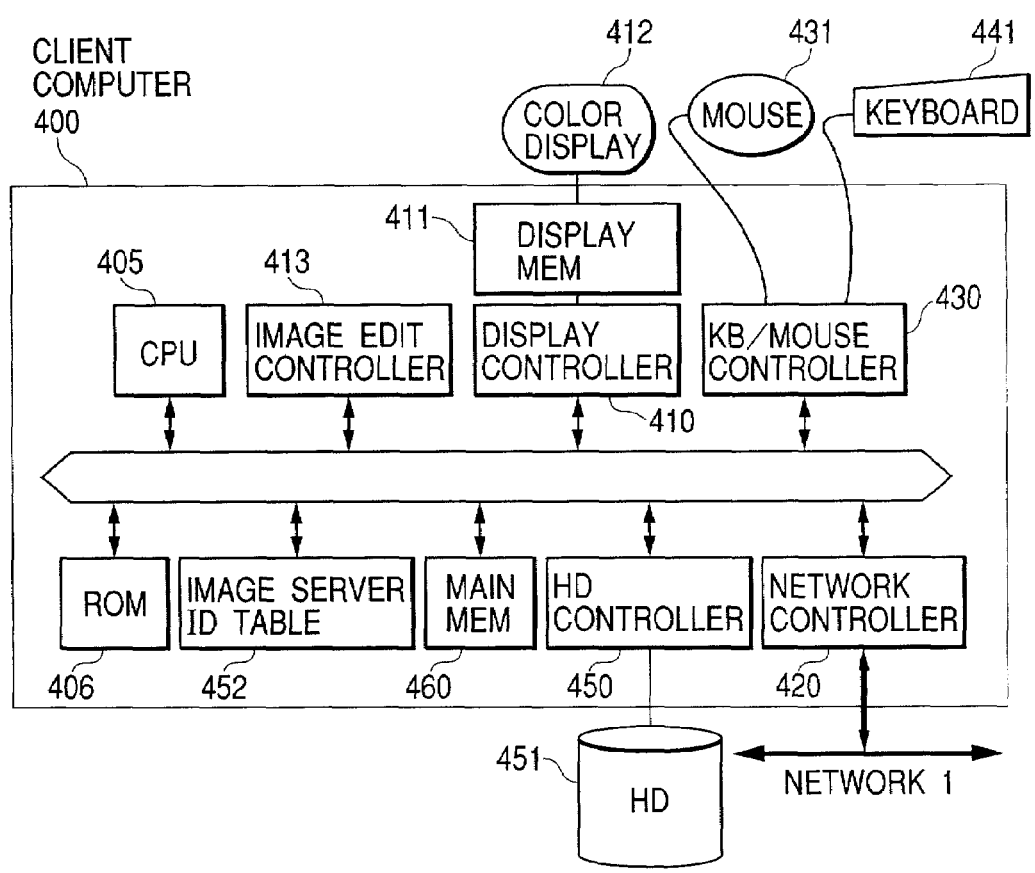
FIG. 4 is a block diagram for explaining a construction of a client computer on a network shown in FIG. 1.

FIG. 4 is a block diagram for explaining a construction of the client computer 400 on the network 1 shown in FIG. 1.

The client computer 400 as the information processing apparatus shown in FIG. 4 includes a network controller 420 for controlling protocol on the network i1 with the image server 200, a CPU 405 for central control of the client computer, a ROM 406, a hard disk (HD) 451 for registering the image data and storing various data, a hard disk controller 450 for controlling the hard disk, and a main memory 460. Incidentally, the application software and the printer driver are also stored in the hard disk 451, and, when executed, they are developed in the main memory 460 and are controlled by the CPU 405.

Further, user's instruction input means is constituted by a mouse 431, a keyboard 441, a color display 412 for displaying layout, edition and menu, a display memory 411, a display controller 410, an image edit controller 413 for effecting image layout and edition on the display memory 411, and an image server ID table 452.

When the user desires to effect printing on the client computer 400, image describing data of the document formed by the application is sent to the printer driver via OS (operating system), and the print data is formed in the printer driver. The formed print data is sent to the network 1 via the network controller 420 and then is sent to the image processing apparatus according to the present invention directly or via the server device.

Figure 5:
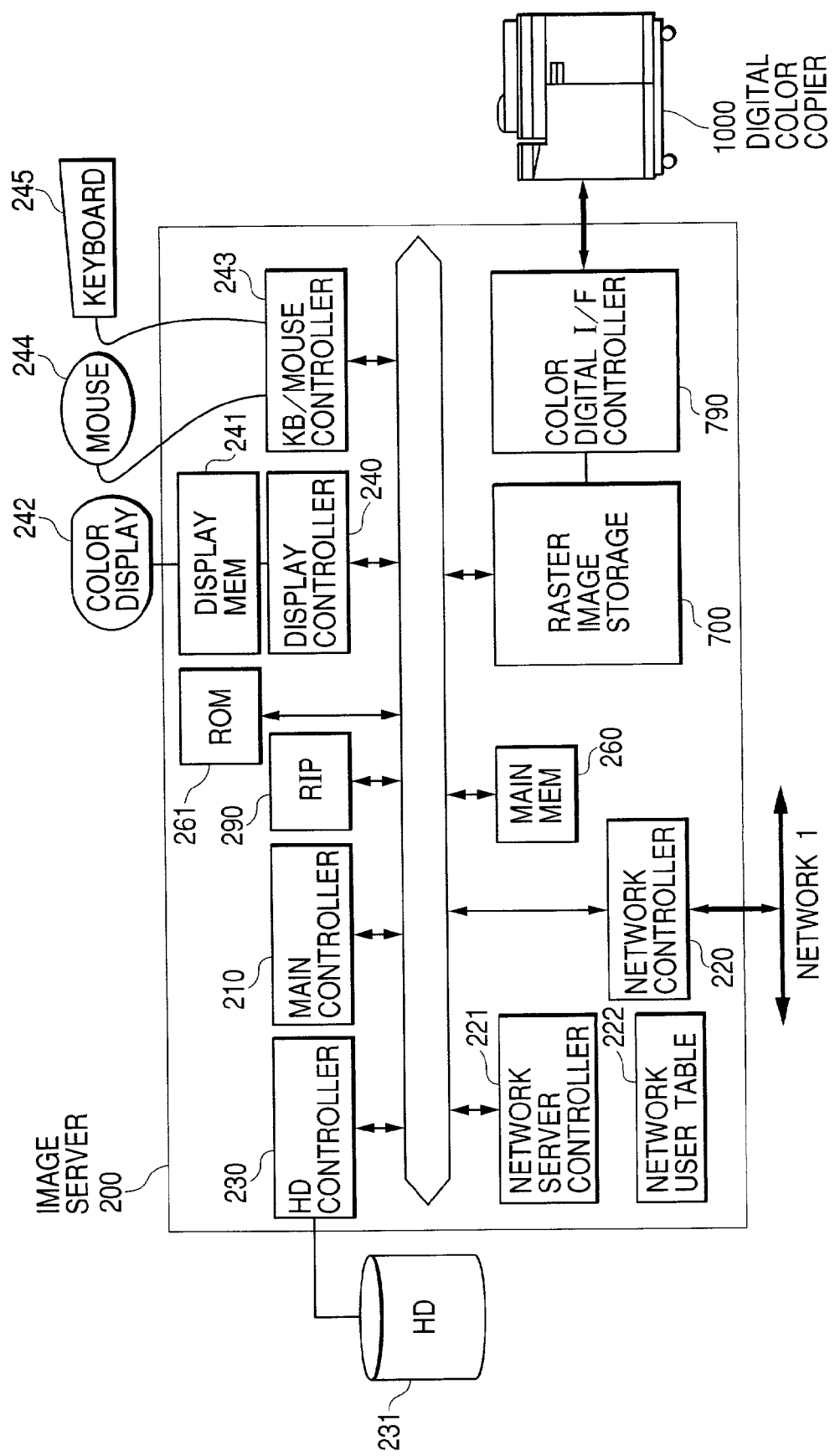
FIG. 5 is a block diagram for explaining a construction of a server device according to the present invention.

FIG. 5 is a block diagram for explaining the construction of the server device according to the present invention, which corresponds to the construction of the image server 200 shown in FIG. 1.

The image server 200 shown in FIG. 5 includes a main controller 210 for controlling the entire image server 200 by loading a control program stored in a ROM 261 to a main memory 260.

A network controller 220 serves to control protocol processing on the network 1. A network server controller 221 serves to control analysis of contents of a packet picked up by protocol and separation of the print data.

A network user table 222 is designed so that the name of the client computer, a network address of the computer and register user ID in the client computer are associated with each other. A taster image processor (RIP) 290 serves to form color multi-value raster image data on the basis of the separated print data and command data.

A raster image storage 700 as storing means serves to store the formed color multi-value raster image data, position thereof and property information thereof. A color digital interface (I/F) controller 790 serves to send and receive the image data and instructions with respect to the digital color copier 1000.

As instruction input means from a server manager, there are provided a mouse 244 controlled by a keyboard/mouse controller 243, a keyboard 245, a color display 242 for displaying layout, edition and menu, a display memory 241, and a display controller 240. Incidentally, access of a hard disk 231 is controlled by a hard disk controller 230.

Figure 6:
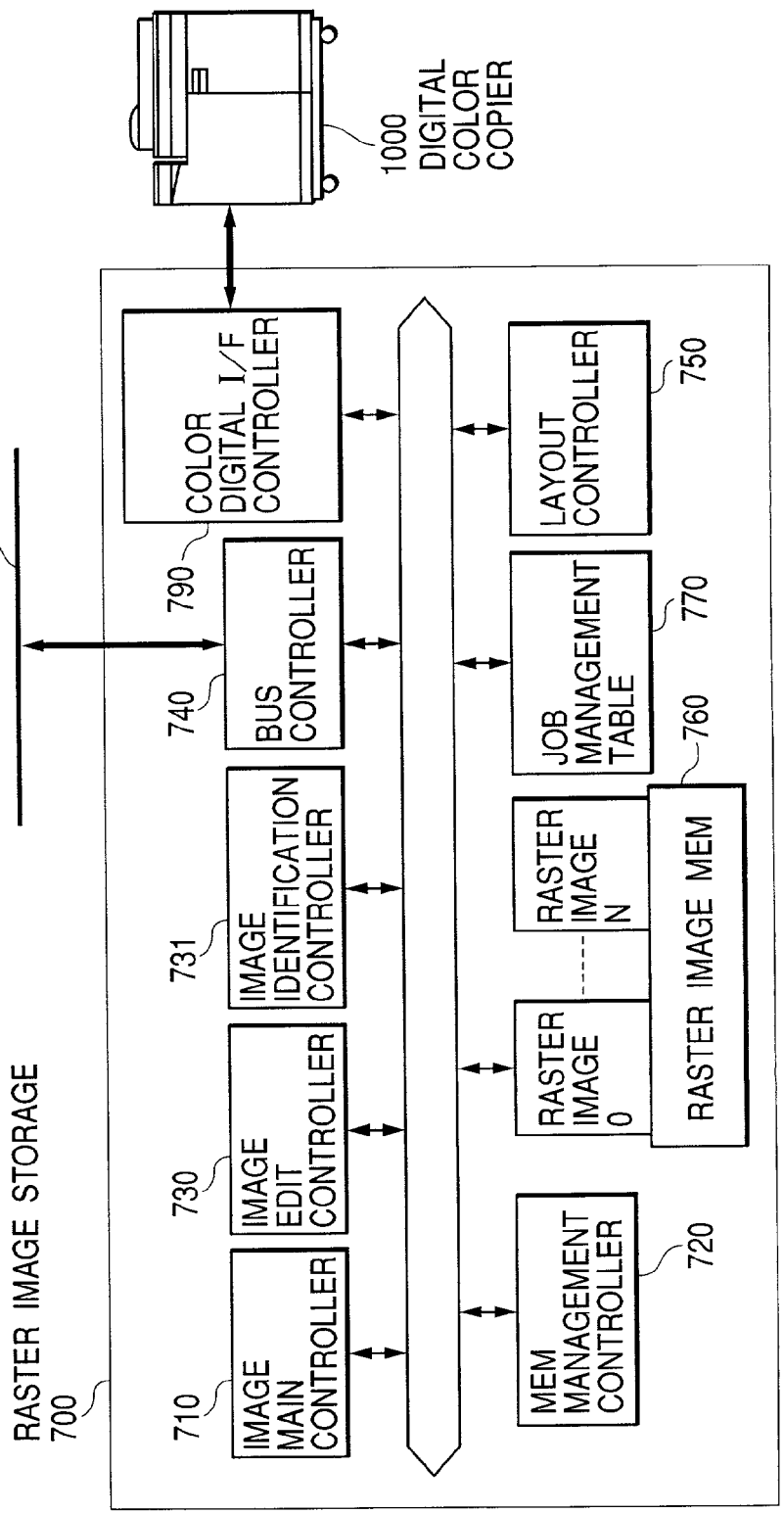
FIG. 6 is a detailed block diagram for explaining a construction of a raster image storage shown in FIG. 5.

FIG. 6 is a detailed block diagram for explaining a construction of the raster image storage 700, and the same elements as those shown in FIG. 5 are designated by the same reference numerals.

The raster image storage 700 shown in FIG. 6 includes a memory management controller 720 as managing means. The memory management controller 720 associates with an image main controller 710 for controlling the entire raster image data to arrange the color raster image data in a raster image memory 760 and effect management thereof. The reference numeral 770 denotes a job management table.

An image edit controller 730 serves to effect image conversion, enlargement/reduction/deformation edition regarding the already registered image data or colors when the image registration is effected from the scanner to the memory. The reference numeral 731 denotes an image identification controller. A layout controller 750 serves to effect layout edition real time when the image data is outputted to the printer. A bus controller 740 serves to control data transfer between an internal bus in the raster image storage 700 and an internal bus in the image server 200.

In the image server 200 constructed in this way, in order to output the image data in the memory, the image data is transferred to the color printer 300 via the color digital interface controller 790. As a result, a color print image can be obtained.

Further, the image data can be inputted from the color scanner 100, and the image data can be registered in the memory via the color digital interface controller 790.

The image data and instruction existing in the main buses of the raster image storage 700 and the image server 200 are based on a specific format, and communication between the image main controller 710 and the main controller of the image server 200 is effected via the bus controller 740.

The raster image storage 700 can manage the image data in a file management mode.

On the other hand, in the printer output, the file management mode is a mode for storing and managing plural image data. Regarding the stored image data, layout of the registered plural image data is effected on the instruction from the main controller 210 of the image server 200, and the image data are outputted to the color printer 300 via the color digital interface controller 790, thereby obtaining a color print image.

In this case, an image data group of one job constituted by plural pages is managed in the raster image memory 760 as a image file, and information such as image file ID, size of the image data and total pages of the image data is registered in the job management table 770 and are managed by the memory management controller 720.

The image data group is outputted to the color printer 300 via the color digital interface controller 790 through the image edit controller 730 for effecting the image conversion regarding the colors of the registered image data when actually outputted and the layout controller 750 for effecting enlargement/reduction/deformation edition when the layout is outputted.

On the other hand, in the scanner input, the file management mode can store and manage the plural scanner input image data, similar to the print output. In this case, the print output image data and the scanner input image data can be existed together.

Similar to the print, the image inputted from the scanner manages the raster image memory 760 by dividing it into plural sections, and the image file ID and image data size are registered in the job management table 770 and are managed by the memory management controller 720.

When the image is actually inputted, an input size designated by the image edit controller 730 for effecting the image conversion regarding the colors of the scanner input image data inputted from the color scanner 100 and the layout controller 750 for effecting enlargement/reduction/deformation edition upon inputting is obtained and is registered in the raster image memory.

Other plural image servers have the same constructions as the aforementioned image server. The respective constructions of the digital color copiers may be the same or may have different functions.

Further, as mentioned above, in the image server 200, while an example that the print data from the client computers 400 are received and stored in the raster image storage 700 and the color raster image is outputted to the digital color copier 1000 if necessary was explained, the image server 200 itself may be included in the digital color copier 1000 and the digital color copier 1000 may be connected to the network 1 directly. In this case, the digital color copier 1000 as the image processing apparatus of the present invention receives the print data from the client computer 400 via the network 1 and stores the color raster image in the raster image storage 700 and reads out the color raster image stored in the raster image storage 700 on the basis of the instruction from the operation panel 107 and effects the print processing in the color printer 300, as will be described later.

Figure 7:
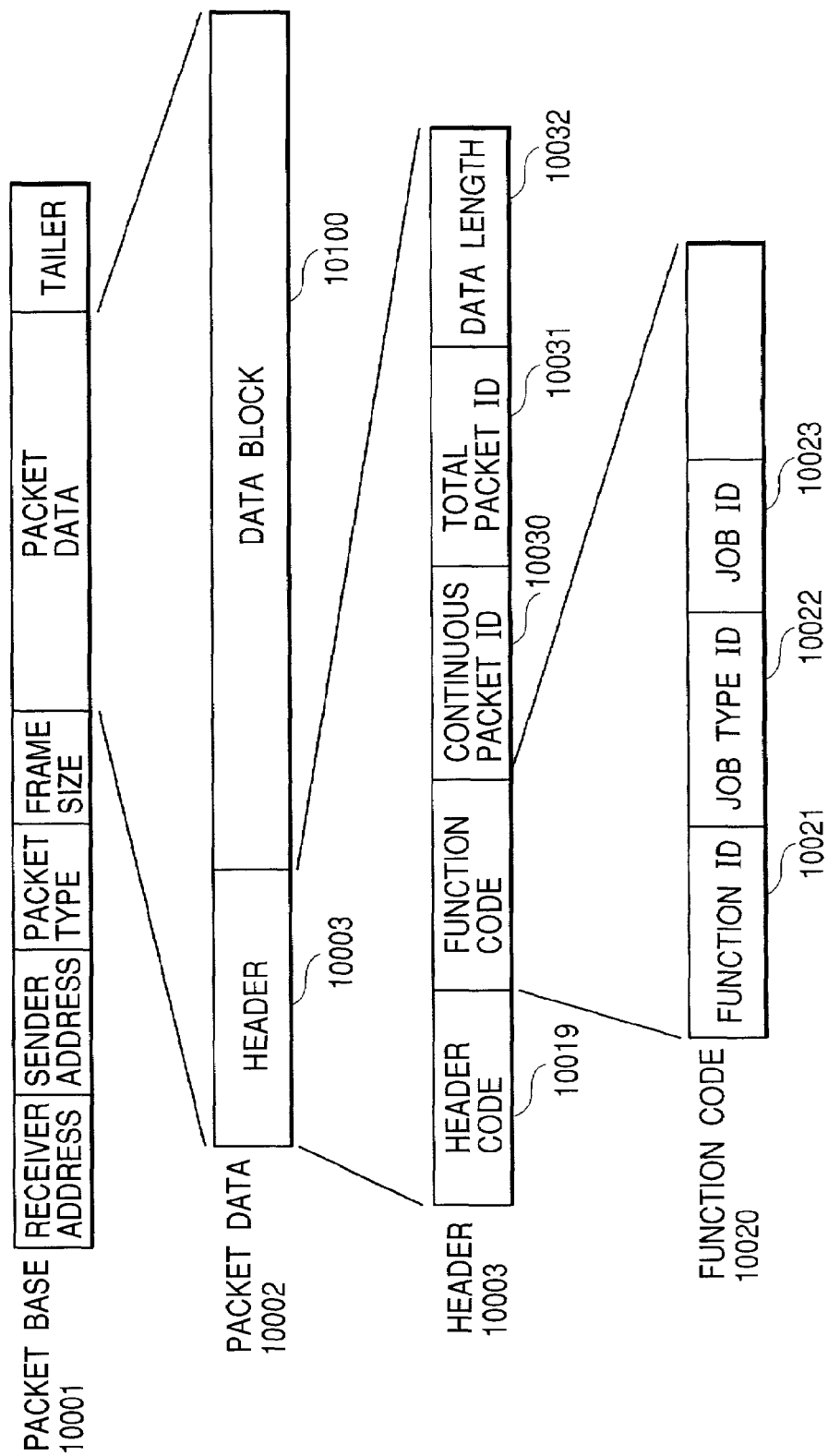
FIG. 7 is a view for explaining a construction of a packet sent and received between the client computer and an image server shown in FIG. 1.

On the network to which the client computers 400 and the image server 200 are connected, in order to perform communication, a block comprised of data rows referred to as packets as shown in FIG. 7 is used and each packet is sent and received.

Figure 8:
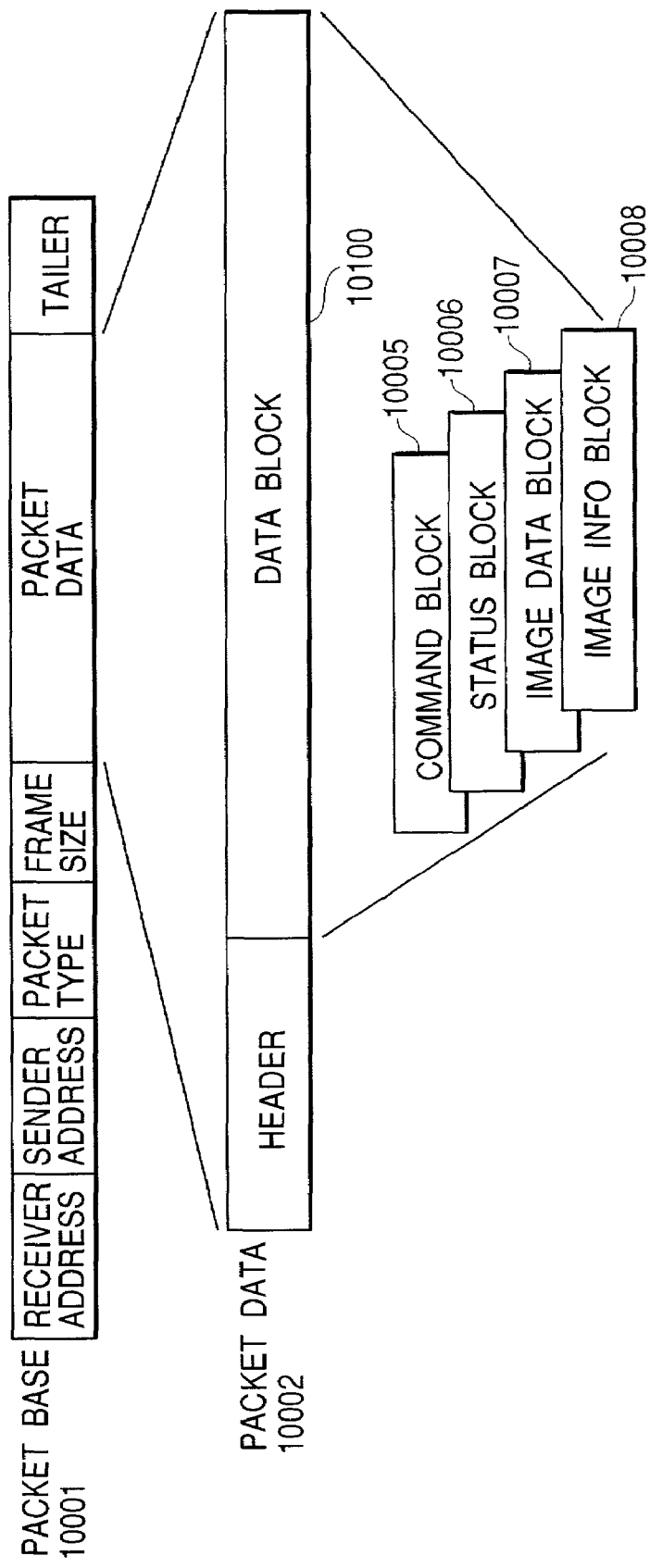
FIG. 8 is a view for explaining a construction of a packet sent and received between the client computer and an image server shown in FIG. 1.
Figure 9:
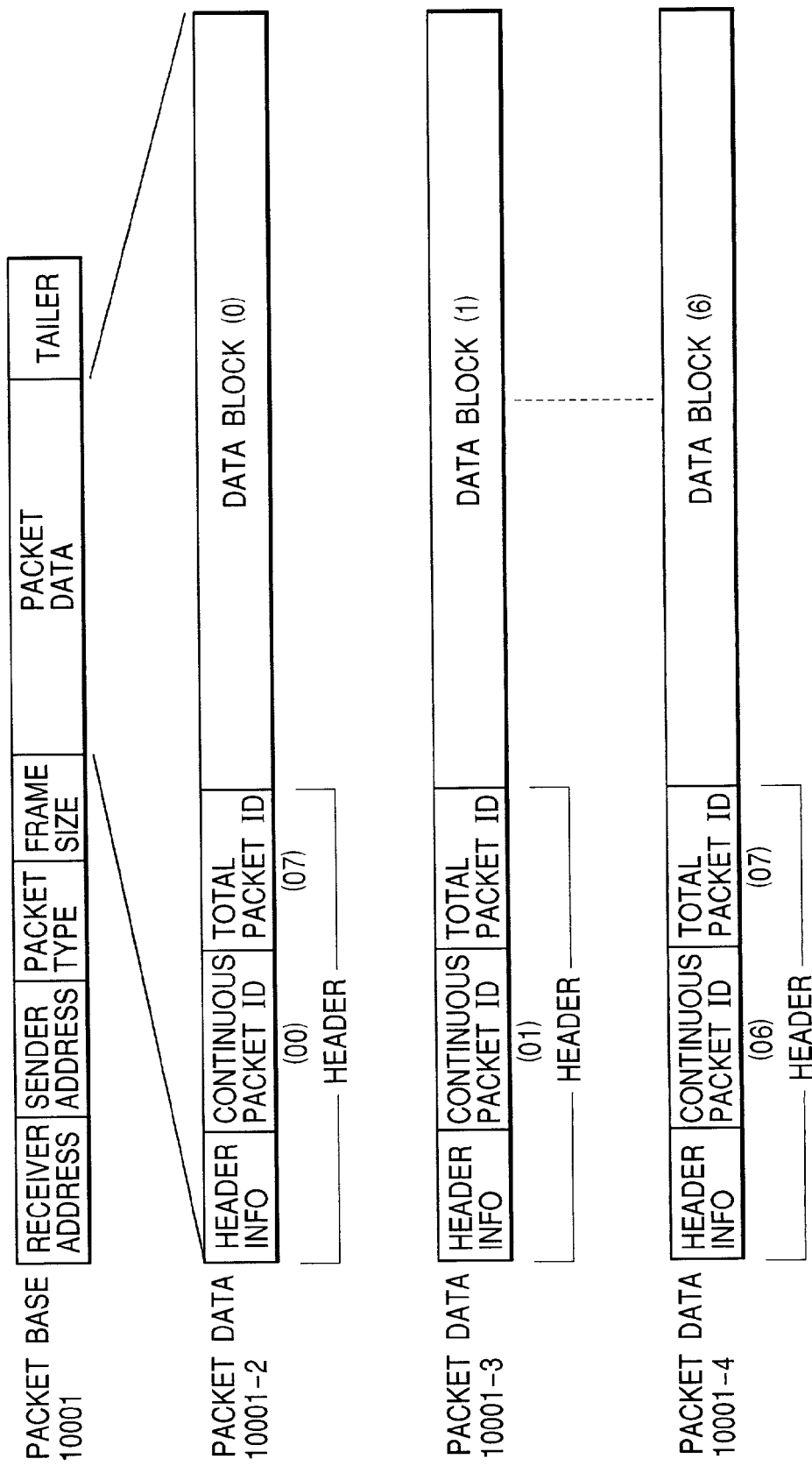
FIG. 9 is a view for explaining a construction of a packet sent and received between the client computer and an image server shown in FIG. 1.

FIGS. 7 to 9 are views for explaining a construction of the packet sent and received between the client computer 400 and the image server 200 shown in FIG. 1.

As shown in FIG. 7, in the illustrated embodiment, in the construction of the packet, receiver network address is set at the top, and then, sender network address is set, and, after packet size and frame size of the packet, actual packet data is set, and lastly, error check such as CRC called as tailer for enhancing reliability of data transfer is added.

Regarding the packet data 10002, although any data can be included, in the illustrated embodiment, as shown in FIGS. 7 and 8, the packet data is divided into a header 10003 and a data block 10100. Further, in case of a continuous network packet, as shown in FIG. 9, continuous packet ID which is a data portion of a packet base 10001 is included, as shown in packet data portions 10001-2 to 10001-4.

In the header 10003 of the packet data 10002, as shown in FIG. 7, first of all, a header code 10019 indicating header information is set at the top, which is followed by a function code 10020 indicating a function of the packet data, continuous packet ID 10030 indicating continuous number when one data is constituted, total packet ID 10031 indicating the total number of packets, and data length 10032 indicating data length of the data block 10100 including the actual data.

Further, the function code 10020 is constituted by function ID 10021 indicating the type of the image server, job type ID 10022 indicating the type of the job regarding the server, and job ID 10023 discriminating the job to be executed.

As shown in FIG. 8, the data block 10100 of the packet data 10002 is divided into a command block 10005, a status block 10006, an image data block 10007 and an image information block 10008 on the basis of the singly determined contents of the job type ID 10022 of the function code of the header.

When the print information sent from the client computer 400 is particular PDL (page describing language), command thereof is set in the command block and is not sent to the image data block and the image information block.

FIG. 10 is a view showing an example of printer dialog displayed on the display of the client computer 400 shown in FIG. 1. The printer dialog is displayed on the display by the printer driver by OS, and the user can set the required information on the printer dialog.

In FIG. 10, according to the printer driver shown in the illustrated embodiment, the page range to be printed can be designated and a job spool type which is important in the present invention can be set in order to permit the printing of the name of the singly determined image server presently connected (connected server), the user ID singly determined, the document name of the original to be printed from now, the size of paper to be printed, the print number and the designated pages as the displayed information and setting contents.

Further, the connected server and the user ID (present subjects thereof) can be ascertained by pressing an ID checking button BT2 and can also be changed to another server.

Furthermore, the job spool type can be selected among two types, and, in case of print type, the designated print job of the document as it is (in the print designation) is printed directly by the printer connected through the designated image server, and the print job is now completed.

Further, in case of a server spool type, the print job is temporarily reserved on the image server 200, and, as will be described later, when the print instruction is inputted from the operation panel of the image processing apparatus, the print job is read out and the print processing is effected by the image processing apparatus. Further, as the job spool type, in place of the server spool type, a printer spool type may be provided so that the print data is spooled in the hard disk of the image processing apparatus and, similarly, when the print instruction is inputted from the operation panel, the data is read out and the print processing is effected. Incidentally, in the following explanation of the illustrated embodiment, it is assumed that the all of the constructions of the image server 200 are included in the digital color copier as the image processing apparatus of the present invention.

FIGS. 11 and 12 are views showing an example of an operation view (picture plane) displayed on the operation panel 107 of the digital color copier 1000 shown in FIG. 1, where FIG. 11 corresponds to an insert/overlay original selection picture plane, and FIG. 12 corresponds to an insert/overlay original setting picture plane.

FIG. 11 shows the insert/overlay original selection picture plane, i.e., a picture plane by which the print data to be printed from now is selected. That is to say, in the printer dialog of the client computer 400, the print data in which the printer spool type (=server spool type, when the image server 200 is included in the digital color copier 1000) is selected as the job spool type is spooled in the raster image storage 700 of the image processing apparatus 1000, and a list of the spooled print data is illustrated in FIG. 11. Incidentally, as mentioned above, although it is desirable that the print data be subjected to RIP (raster image processing) in the viewpoint of a print processing speed, it should be noted that the print data before RIP may be stored in the raster image storage 700 and, when the print is instructed in FIG. 11, the subject document may be subjected to RIP and the print processing of the document may be effected in the color printer 300. Further, each document listed and displayed in FIG. 11 is not printed until an OK button BT11 is depressed. In FIG. 11, in a condition that the document is selected, when the OK button BT11 is depressed, the insert/overlay original setting picture plane shown in FIG. 12 is displayed on the operation panel 107.

FIG. 12 shows the display picture plane for effecting front cover insert setting with respect to the document selected in FIG. 11. When the user inputs the instruction information with respect to the display picture plane of FIG. 12 displayed on the operation panel 107, the front cover, back cover and middle overlay can be set.

When a first type (front cover inset) is selected, regarding the previously formed document, a first page original for the front cover prepared by the user is read out by the scanner 100 and the read image data is inserted in the first page of the document as the front cover of the document is executed.

On the other hand, when a second type (front/back cover insert) is selected, regarding the previously formed document, a function in which a first page original for the front cover prepared by the user is read out by the scanner 100 and the read image data is inserted in the first page of the document as the front cover of the document and a prepared second page original for the back cover is read out by the scanner and the read image data is inserted in the past page as the back cover of the document is selected.

Further, when a third type (front/back cover insert, middle overlay) is selected, regarding the previously formed document, a function in which a first page original for the front cover prepared by the user is read out by the scanner 100 and the read image data is inserted in the first page of the document as the front cover of the document and a second page original for the middle overlay prepared by the user is read out by the scanner 100 and the read image data is overlaid on the print of the previously formed document a prepared third page original for the back cover is read out by the scanner and the read image data is inserted in the past page as the back cover of the document is selected.

Further, when a fourth type (front/back cover, reverse insert) is selected, regarding the previously formed document, a function in which a first page original for the front cover and a fourth page original for the back cover prepared by the user are inserted in the first and last pages of the document as the front and back covers and second and third page originals for reverses of the front and back covers are printed as the reverses of the inserted front and back covers is selected.

In this way, in the illustrated embodiment of the image processing apparatus, the apparatus is designed so that the user can select any type among the four types on the insert/overlay original setting picture plane (FIG. 12) as input means for inputting the designation information for arranging the plural image originals read by the scanner 100 at different predetermined positions of the print data.

Further, in the illustrated embodiment of the image processing apparatus, the apparatus is designed so that the user can select the document to be printed among the print data stored in the raster image storage 700 on the insert/overlay original selection picture plane (FIG. 11) as first input means for inputting information for designating the print data to be printed and can select designation such as the front cover on the insert/overlay original setting picture plane as second input means for inputting the information for arranging the image originals read by the scanner 100 at predetermined positions of the print data.

Figure 13:
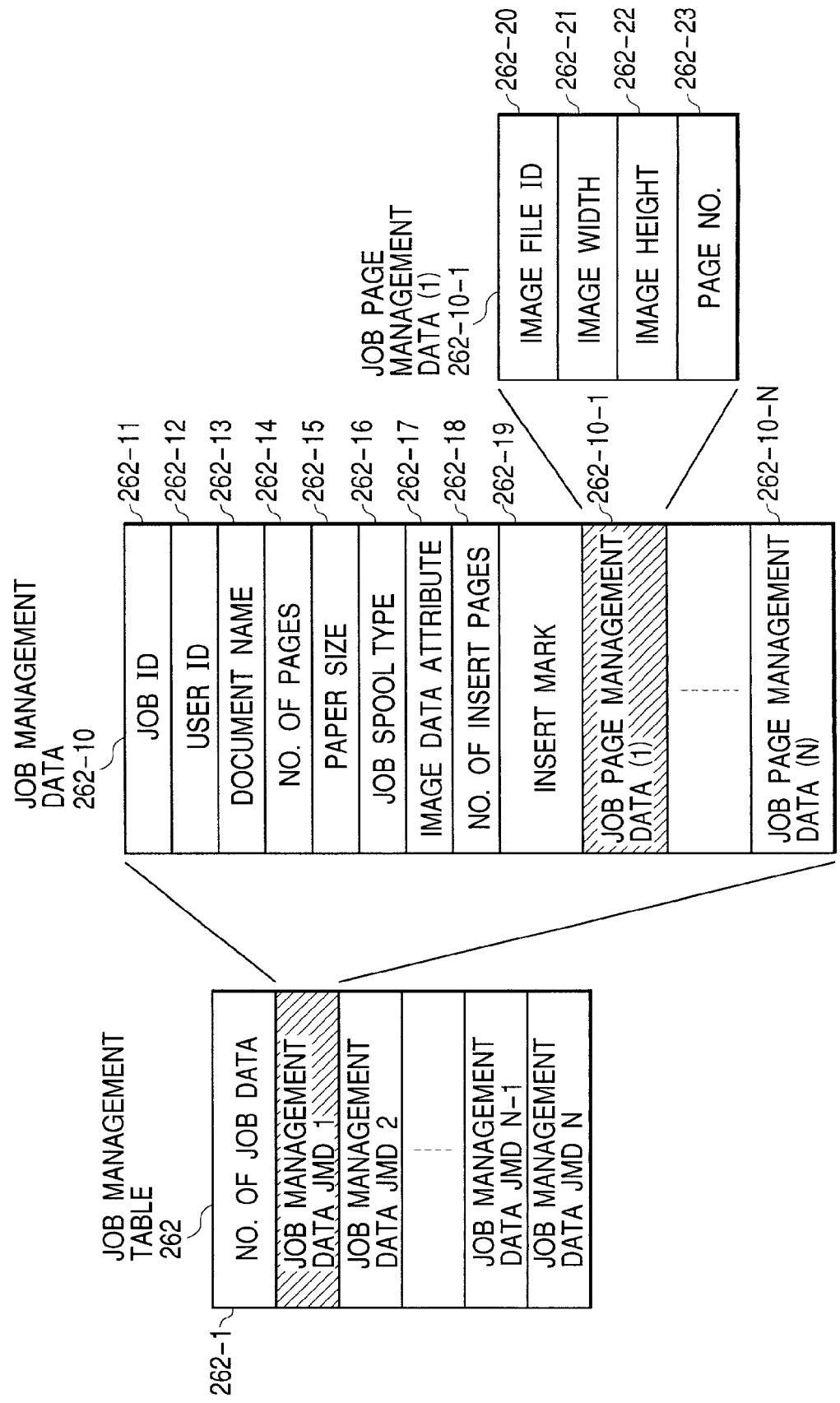
FIG. 13 is a view showing a construction of a job management table managed by the image server.

FIG. 13 is a view showing a construction of the job management table managed by the image processing apparatus 1000 or the image server 200 shown in FIG. 1.

In FIG. 13, a job management table 262 is constituted by total number of job management data 262-1 and job management data JMD1 to JMDN.

Further, as shown in job management data 262-10, the job management data JMD1 to JMDN include job ID 262-11, user ID 262-12, document name 262-13, total number of pages 262-14, paper size 262-15, job spool type 262-16, image data attribute 262-17, total number of insert pages 262-18, insert mark 262-19 and job page management data 262-10-1 to 262-10-N.

Further, the job page management data 262-10-1 to 262-10-N include image file ID 262-20, image width 262-21, image height 262-22 and page number 262-23, as job page management data.

The main controller 210 counts up the total number of job management data 262-1 of the job management table 262 and retrieves vacant job management data 262-10 and sets ID values in the user ID 262-11 and the job ID 262-12 of the data.

Thereafter, from the client computer 400, converted PDL command corresponding to one page is firstly sent to the image server 200 as the command data block. In the image server 200 side, the main controller 210 separates the contents of the packet into the header and the data block and analyzes the fact that the contents of the data block are PDL command and forms the data corresponding to one page from PDL in the RIP 290.

The formed image data corresponding to one page is registered in the raster image memory 760 as an image file. In this case, the singly determined image file ID is stored as the image file ID 262-20 in the job page management data 262-10-1 of the job management table 262. Similarly, size (image width) 262-21, image height 262-22 and page number 262-23 of the image data are also stored and renewed.

Incidentally, in case of plural pages, further, from the client computer 400, converted PDL command corresponding to next one page is sent to the image server 200 as the command data block, and, by repeating the similar processing for the designated number of pages, image data (image file) corresponding to the designated number of pages are stored in the raster image memory 760.

The main controller 210 retrieves the type of the job spool type 262-16 in the job management data 262-10, and, when the type is the print type, in the normal print processing, in accordance with the command from the main controller 210, the registered plural image data are subjected to layout and are outputted to the color printer 300 via the color digital interface controller 790.

On the other hand, when the type of the job spool type 262-16 is the server spool type, the main controller 210 does not effect the above-mentioned print processing, but sets the user ID and the job ID of the received job in the data block of the packet data as status information data via the network controller 220 and re-sends the job type ID in the header to the previous client computer as ID of the singly determined status block. As a result, connection between the client and the image server is released.

Figure 14:
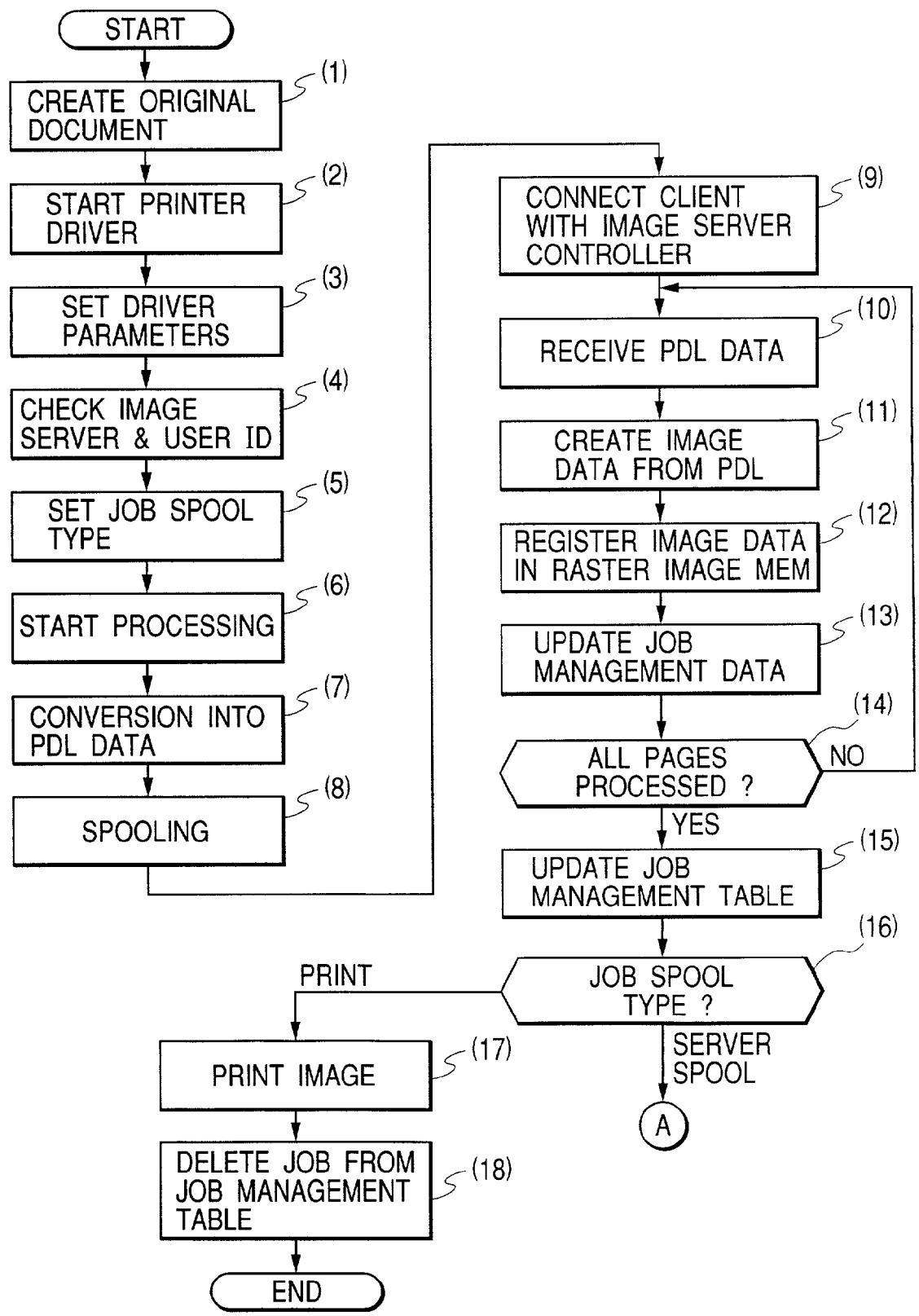
FIG. 14 is a flow chart showing an example of data processing sequence in the server device and the image processing apparatus according to the present invention.
Figure 15:
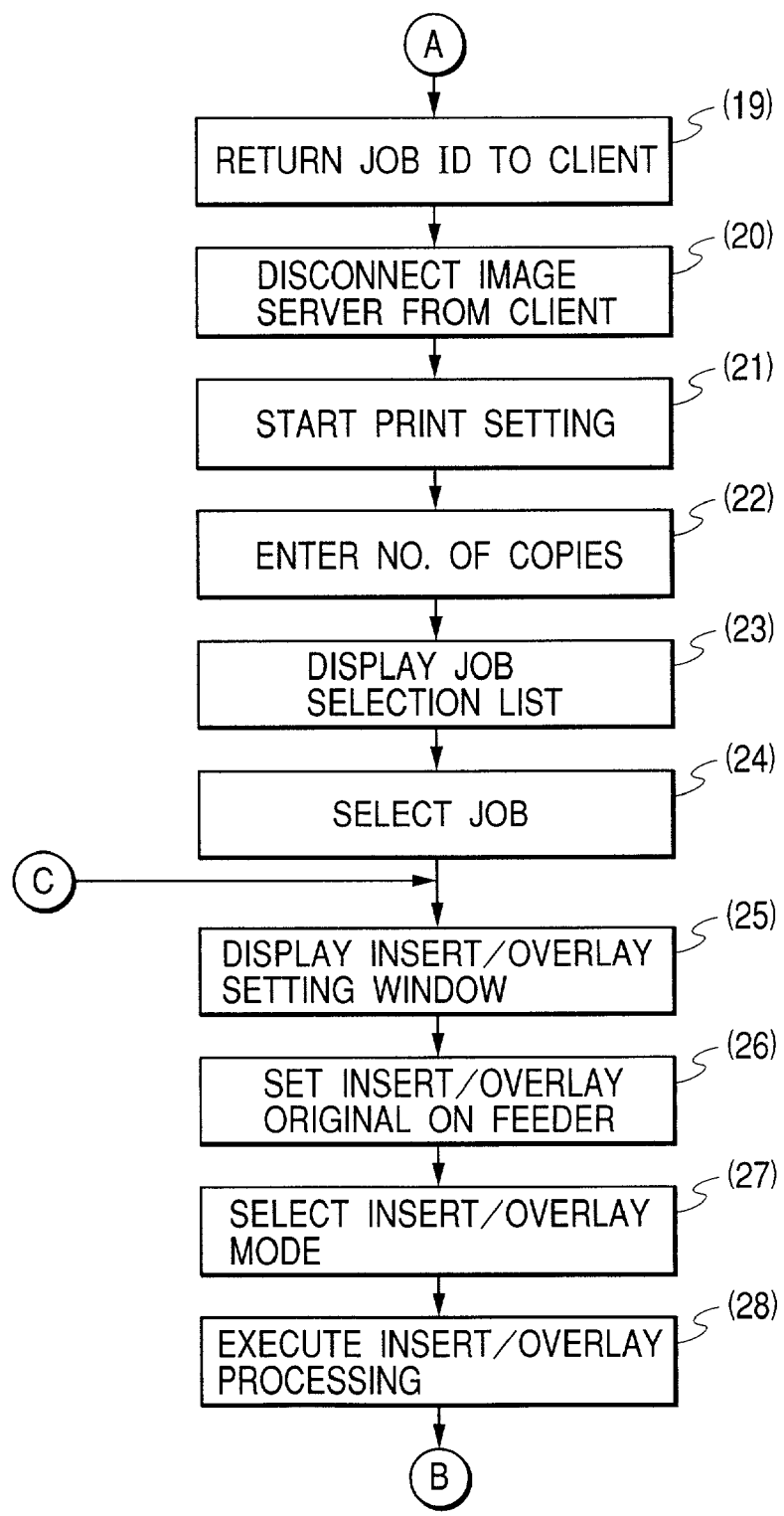
FIG. 15 is a flow chart showing an example of data processing sequence in the server device and the image processing apparatus according to the present invention.
Figure 16:
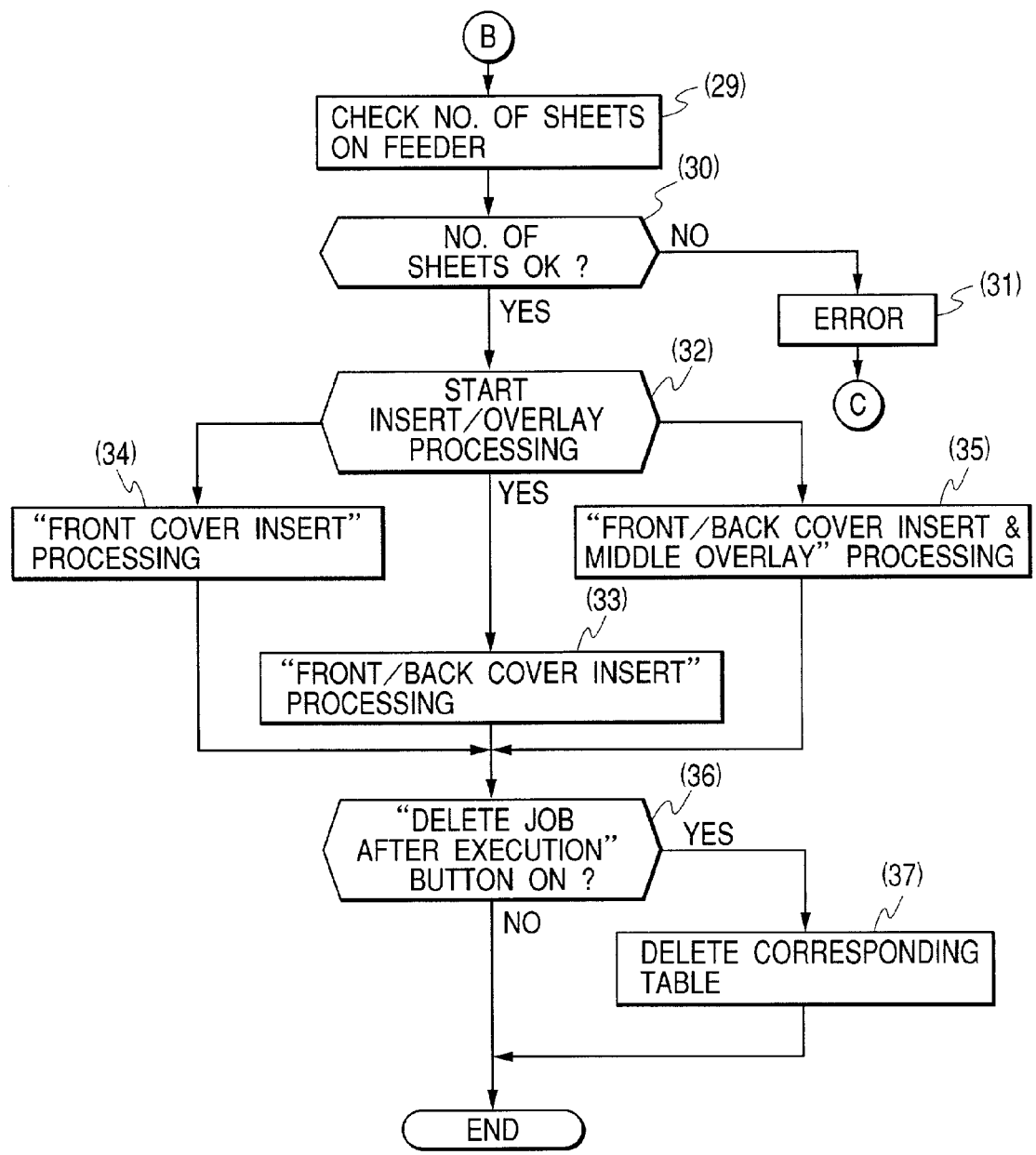
FIG. 16 is a flow chart showing an example of data processing sequence in the server device and the image processing apparatus according to the present invention.

FIGS. 14 to 16 are a flow chart showing an example of data processing sequence in the image processing apparatus and the image processing system according to the present invention. Incidentally, (1) to (37) indicate steps.

In the client computer 400, any software is loaded on the main memory 460 by the hard disk 451 and the software is executed by the CPU 405, thereby forming the original (1).

When the original formed by the software is printed, in accordance with the user's designation, the CPU 405 selects the printer driver stored in the hard disk 451 and starts it on the main memory 460 (2). The designated print driver started displays the dialog shown in FIG. 9 on the display of the client computer 400.

Here, parameters of the driver including designation of print page range and job spool type which is important in the present invention are set by the CPU 405 in accordance with the user's instruction (3) in order to permit the printing of the name of the singly determined image server presently connected (connected server), the user ID singly determined, the document name of the original to be printed from now, the size of paper to be printed, the print number and the designated pages as the displayed information and setting contents.

Then, when the ID check button BT2 is depressed, the CPU 405 checks the present subjects of the connected server and the user ID (4). Incidentally, here, the user can change to another image server.

Further, the CPU 405 sets the job spool type on the basis of the instruction inputted by the user (5). In the illustrated embodiment, as mentioned above, the job spool type can be selected among two types, and, when the print type is selected, the designated print job of the original as it is (in the print designation) is printed directly by the printer connected through the designated image server, and the print job is now completed.

After the above setting is finished, on the picture plane shown in FIG. 10, when the print execution button BT1 is depressed, the printer driver analyzes the image drawing data inputted from the application through the OS and starts to PDL (print describing language (6)).

The printer driver effects data conversion from internal command inherent to the OS normally supported on the particular OS to PDL supported in the printer and the image server (7). When the data conversion to PDL is finished, the printer driver executes the spool processing on the client computer (8).

Then, the printer driver sends the instruction to the network controller 420 through the OS so that communication with the image server controller 220 of the image server 200 is effected, and the network controller 420 establishes connection to the image server controller 220 in accordance with the instruction (9).

More specifically, the network controller 420 extracts the network address of the designated image server from the image server ID table 452 of the network address of the image server previously registered in the client computer.

The network controller 420 sets the receiver address of the packet base 10001 and sets the singly determined print job in the function ID of the header as ID for discriminating a function and clarifies the fact that the executing condition relates to the print. As the type ID of the job, the singly determined ID indicating the data block of the command is set.

In this case, in the data block, the user ID, document name, paper size to be printed, print number and job spool type which are various print parameters set on the printer dialog are set.

The client computer 400 sends the packet data to the image server 200 through the network controller 420, thereby establishing the connection to the image server 200.

At the time when such connection is established, the main controller 210 registers the user ID, document name, paper size to be printed, print number and job spool type which are various print parameters onto the job management table 262 shown in FIG. 13 from the job ID and the sent command packet.

The main controller 210 counts up the job management data total number 262-1 of the job management table 262 and retrieves the vacant job management data 262-10 and sets the ID value in the user ID 262-11 and the job ID 262-12 of the data.

Thereafter, the client computer 400 sends the PDL command corresponding to one page the image server 200 as the command data block as a first part of the print data.

In the image server 200 side, the main controller 210 receives PDL data including the PDL command (10) and divides the content of the packet into the head and the data block and ascertains the fact that the content of the data block is the PDL command.

Then, in the RIP 290, the image data corresponding to one page is formed from PDL (11). The formed image data corresponding to one page is registered in the raster image memory 760 as the image file (12). The main controller 210 updates the job management data (13).

Then, the main controller 210 judges whether all pages in one job are processed or not (14), and, if N (NO), the program is returned to the step (10); whereas, if Y (YES), the singly determined image file ID, and image file ID 262-20, image data size (image width) 262-21, image height 262-22 and page number 262-23 in the job page management data 262-10-1 of the job management table 262 are updated (15).

The main controller 210 judges the type of the job spool type 262-16 (16). If it is judged that the job spool type 262-16 is the server spool type, the aforementioned print processing is not effected, but the user ID and the job ID of the received job are set in the data block of the packet data as the status information data, and the job type ID in the header is sent to the previous client computer as ID of the singly determined status block (19), thereby releasing the connection between the client computer 400 and the image server 200 (20).

On the other hand, in the step (16), if it is judged that the job spool type 262-16 is the print type, as mentioned above, as the normal print processing, layout of the registered plural image data is effected on the basis of the command from the main controller 210 of the image server, and the image data are outputted to the color printer 300 via the color digital interface controller 790, thereby obtaining the color print image (17).

The designated job is deleted from the job management table 262 (18), and the processing is ended.

When the job spool type 262-16 is the server spool type, the main controller 210 does not print out the print data but stores it in the storage. When the print of the document information previously registered in the image server 200 is required, the user manipulates the operation panel of the copier for effecting the printing by referring an image original document separately formed to correspond to the output of the print. The image processing apparatus starts the print setting in accordance with the manipulation of the operation panel (21).

In this case, the front cover and the like as the image original can freely be selected in accordance with usage of the document or recipient requirement and is nor required to be previously formed upon formation of document server-spooled.

In accordance with the user's instruction on the operation panel 107 of the digital color copier, the image processing apparatus inputs and sets the required number of copies (22). After the setting, the user depresses the item of the insert/overlay original. As a result, the operation panel controller 106 recognizes the selection of this item and instructs the scanner controller 101 to form the job selection list.

The scanner controller 101 sends the previously singly determined job list request command to the main controller 210 of the image server 200 via the interface controller 104, and the main controller 210 retrieves the job management table 262 to find the job ID, document name, total page number and user ID regarding the job presently registered and reserved in the raster image storage 700 and forms the job selection list which is in turn sent to the scanner controller 101.

The operation panel controller 106 receives the job selection list data from the scanner controller 101 and displays the operating picture plane or window regarding the job selection list shown in FIG. 11 on the operation panel as the display means (23).

Here, when instruction for selecting desired job among the job selection list is inputted (OK button BT11 is depressed), the image processing apparatus selects the desired job (24). Then, the operation panel controller 106 displays the setting picture plane or window (input means or second input means) for designating the type of the insert/overlay original shown in FIG. 12 on the operation panel (25).

Incidentally, on the setting window for designating the type of the insert/overlay original shown in FIG. 12, the job number, document name, total page number and user ID regarding the previously selected job are displayed, and an insert/overlay method can be selected among three types.

Then, the image processing apparatus detects the fact that the insert/overlay original is set on the feeder 1200 (26). When instruction for selecting a desired insert/overlay method among the above-mentioned four types is inputted, the image processing apparatus selects the instructed desired insert/overlay method (27). The image processing apparatus executes the processing of the insert/overlay original on the basis of the selected type (28). In this case, a "delete job after execution" button BT12 for designating whether the job in question is deleted from the image server is set.

Then, the scanner controller 101 checks the number of originals on the feeder 1200 (29) and judges whether the number required for the selected insert/overlay method coincides with the number of actually read originals (30). If NO, error information is displayed on the operation panel (31), and the program is returned to the step (25).

In the step (30), if YES, the scanner controller 101 of the image processing apparatus judges the designated insert/overlay mode (32). If it is judged that the front cover insert is designated, in a step (34), the scanner controller 101 of the image processing apparatus and the printer controller 301 execute the front cover insert mode processing. If it is judged that the front/back cover insert is designated, in a step (35), the scanner controller 101 of the image processing apparatus and the printer controller 301 execute the front/back cover insert mode processing. If it is judged that the front/back cover insert+middle overlay is designated, in the step (35), the scanner controller 101 of the image processing apparatus and the printer controller 301 execute the front/back cover insert+ middle overlay mode processing. Incidentally, although not shown, also if the front/back cover/reverse insert is designated, the front/back cover/reverse insert processing is executed.

The operation panel controller 106 of the image processing apparatus judges whether depression of the "delete job after execution" button BT12 shown in FIG. 12 is instructed (36). If NO, the processing is ended; whereas, if YES, the job management table regarding the designated job managed in the image server 200 is deleted (37), and the processing is ended.

Figure 17:
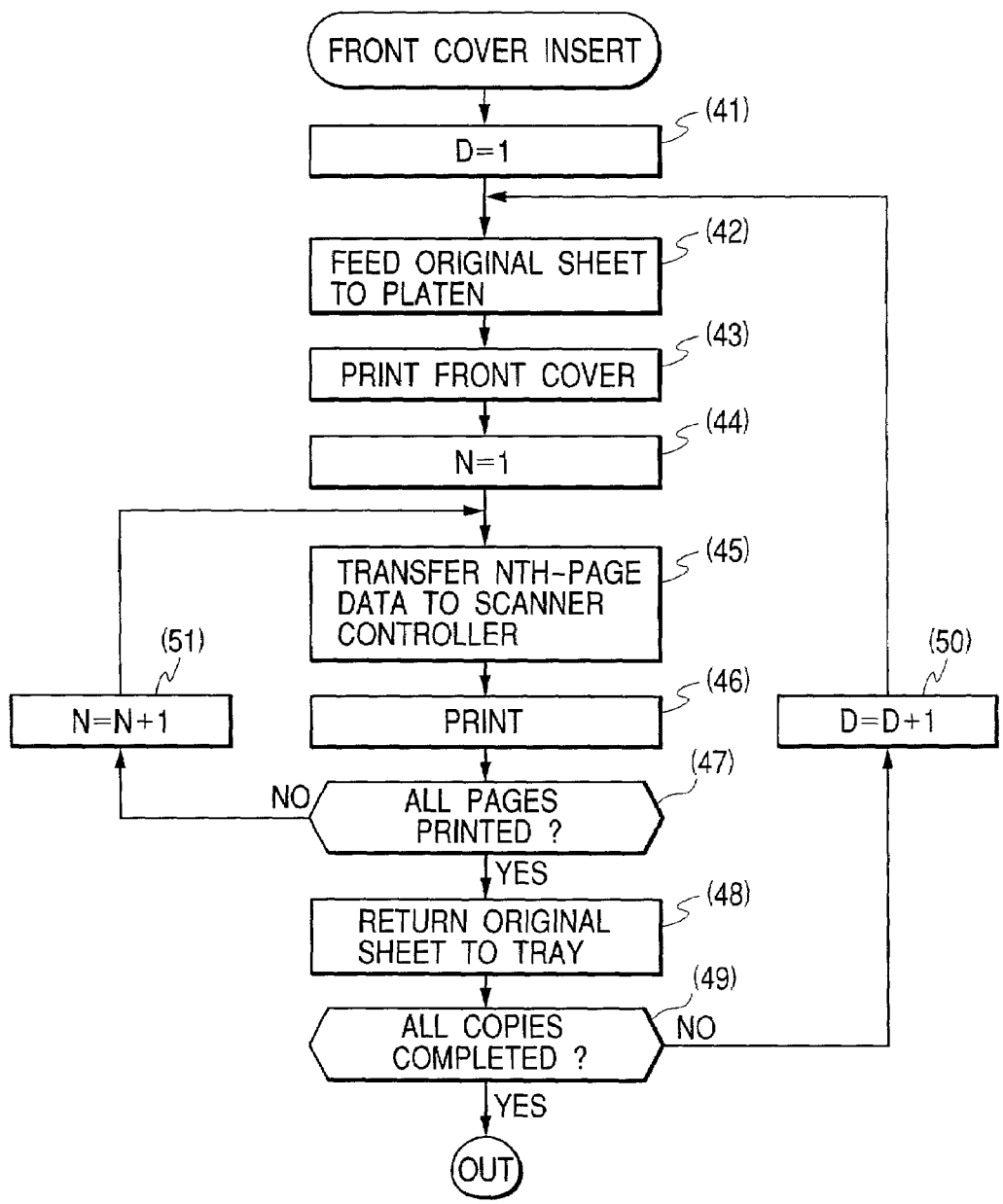
FIG. 17 is a flow chart showing an example of first data processing sequence in the image processing apparatus according to the present invention.

FIG. 17 is a flow chart showing an example of first data processing sequence in the image processing apparatus according to the present invention, which corresponds to the front cover insert mode processing sequence in the step (34) shown in FIG. 16. Incidentally, (41) to (51) show steps. Incidentally, it is assumed that the image server 200 is included in the digital color copier 100 as the image processing apparatus.

The user sets one original for forming the front cover on the stacking tray 1201 of the feeder 1200 of the digital color copier.

Here, when the OK button on the operation panel regarding the insert/overlay original is pressed, the insert/overlay processing is started.

First of all, the main controller 210 of the image processing apparatus sets a number count parameter D to "1" (41). The main controller 210 firstly sends set command for the recycle lever 1209 to the scanner controller 101 of the digital color copier 1000 and the feeder controller 105.

The feeder controller 105 sets the recycle lever 1209 on the upper surface of the original on the stacking tray 1201, and a code indicating completion of setting is returned to the main controller 210 of the image server 200.

Then, the scanner controller 101 emits command for setting the original at the exposure start position on the platen glass 1131. The feeder controller 105 feeds the original and sets the original on the platen glass in accordance with the aforementioned process (42). In this case, the paper width in the paper feeding direction is detected by the paper width sensor 1212 provided in the path I and the number of passed originals is counted up.

Thereafter, the original on the platen glass is returned onto the stacking tray 1201 through the paths III, V and VI. Incidentally, the feeder controller 105 judges whether all of the originals are counted up or not by judging whether the recycle lever 1209 drops on the stacking tray or not. At the time when all of the originals are finished, the scanner controller 105 sends the total number of originals to the main controller 210 of the digital color copier.

In this case, the scanner controller 101 as judging means judges whether the counted number is one (number of front cover insert). If the number does not coincide with the actual number, the error message is displayed on the operation panel, and the insert/overlay original dialog is displayed on the operation panel again thereby to ascertain the setting.

If the set number (one) coincides with the actual number, the front cover insert processing designated by the user is effected. Namely, the feeder 1200 is operated again to read the image of the front cover original.

On the basis of the original feeding sequence of the feeder 1200, at the time when the original is set on the platen glass, the main controller 210 as print processing means sets trigger of scanner input to the color scanner 100 of the digital color copier 1000 via the digital color interface controller 790.

As a result, the original is inputted as R, G, B image data and is printed as the front cover in the printer of the digital color copier by means of the above-mentioned means (43) and then is outputted onto the tray. Here, a page count parameter N is set to "1" (44).

Then, after the front cover is printed, the scanner controller 101 emits print execution command to the main controller 210 of the image server 200 via the interface controller, together with the job ID designated in the job selection list, user ID and print number set by the user on the operation panel as parameters of command.

When the command is received, the main controller 210 of the image server 200 retrieves the designated job from the job management table 777 in accordance with the aforementioned print sequence and retrieves the image file ID in the job page management data of the first page of the job and transfers the image data as print data from the image file in question via the memory management controller 720 to the scanner controller 101 of the digital color copier 1000 through the digital color interface controller 790 (45) and effects the print processing via the print controller 301 (46).

Then, in a step (47), the main controller 210 judges whether such processing is effected with respect to all of pages. If NO, increment "1" of the parameter N is effected (51) and the program is returned to the step (45), and the processing from the step (43) is repeated by the number of parts designated by the user.

On the other hand, in the step (47), at the time when the print of all number of parts is judged to be finished, the front cover original on the platen glass is returned onto the stacking tray 1201 through the paths III, V and VI (48). It is judged whether the print of the designated number of parts is finished (49). If YES, this processing is out; whereas, if NO, increment "1" of the number parameter D is effected and the program is returned to the step (42).

Here, when the "delete job after execution" button BT12 for designating whether the previously set job in question is deleted from the digital color copier 1000 is turned ON, the scanner controller 101 sends deletion command for the designated job to the main controller 210 of the image processing apparatus.

The main controller 210 retrieves the job of the job ID/user ID in question in the job management table 262 from the job management table 262 in accordance with this command and deletes the job from the table.

In this way, any front cover can be added later to the previously determined document, and the print of any number of plural parts can be executed as post-processing.

Incidentally, the processing according to the illustrated embodiment can also be applied to a case where only one-face printing is permitted in the image processing apparatus.

Figure 18:
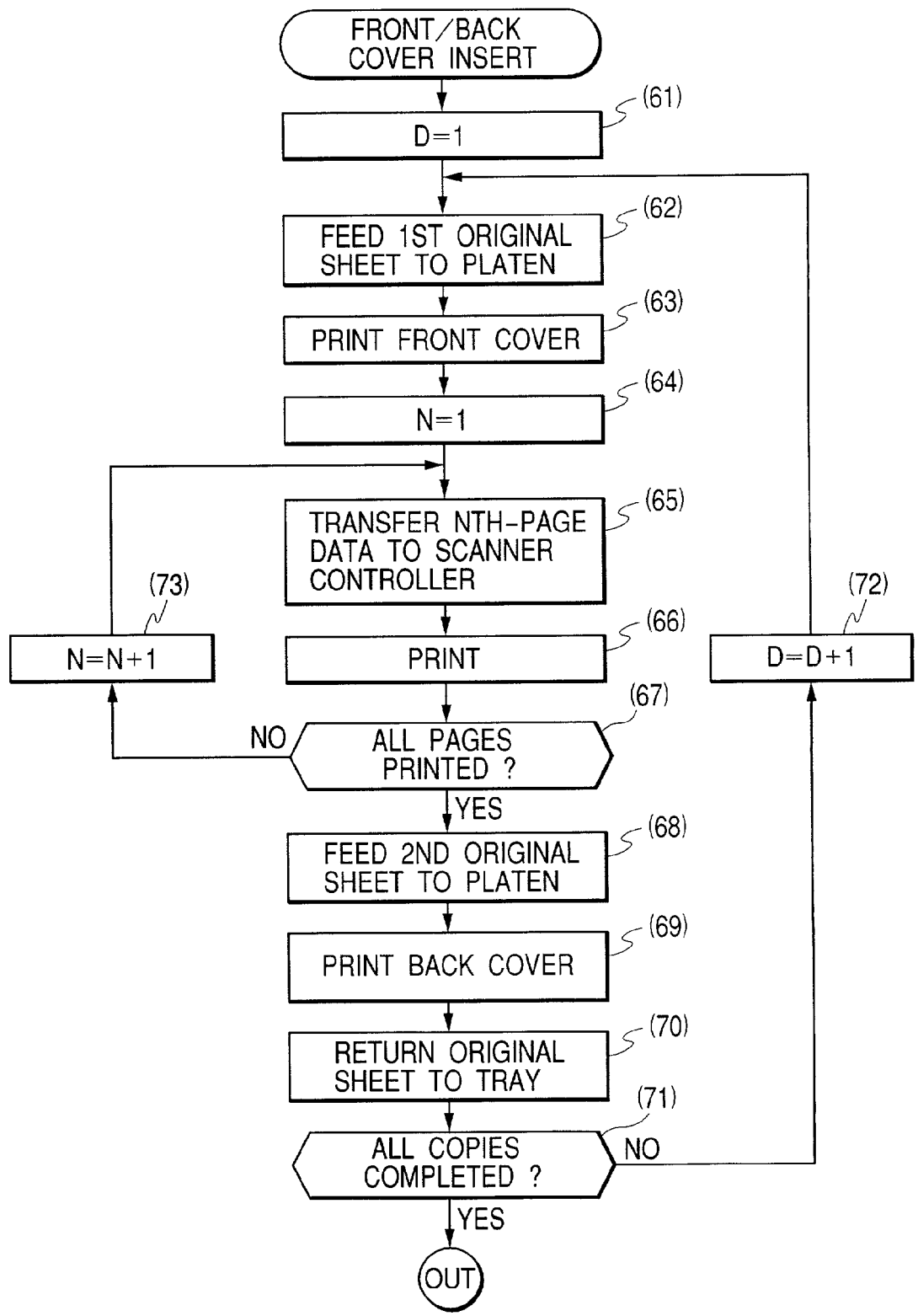
FIG. 18 is a flow chart showing an example of second data processing sequence in the image processing apparatus according to the present invention.

FIG. 18 is a flow chart showing an example of second data processing sequence in the image processing apparatus according to the present invention, which corresponds to the front/back cover insert mode processing sequence in the step (33) shown in FIG. 16. Incidentally, (61) to (73) show steps.

In the step (32) shown in FIG. 16, if it is judged that the selected type is the front/back cover insert mode as a second mode, the user sets two originals comprised of the front cover and the back cover in order on the stacking tray 1201 of the feeder 1200 of the digital copier, and, when the OK button on the operation panel regarding the insert/overlay original is pressed, the processing is started.

Steps (61) to (67) and (73) similar to the steps (41) to (47) and (51) shown in FIG. 17 are executed.

In a step (67), when it is judged that raster images of all pages are printed, in a step (68), a second original set on the feeder 1200 is fed onto the reflection original plate (platen glass).

They, by the processing similar to that in a step (63), the back cover is printed (69). The back cover original on the platen glass is returned onto the stacking tray 1201 through the paths III, V and VI (70). It is judged whether the printing of the designated number of parts is finished (71). If YES, the processing is out; whereas, if NO, increment "1" of the number parameter D is effected (72) and the program is returned to a step (62).

Incidentally, in order to add the front cover and the back cover to the print data, the image processing apparatus 1000 can print both-faces or must have a function for turning over front and back surfaces. When plural image processing apparatuses 1000 are connected to the image server 200, since it is considered that a certain apparatus permits only one-face printing and another apparatus can effect both-face printing, on the basis of such condition, control for previously limiting selectable types may be effected.

Figure 19:
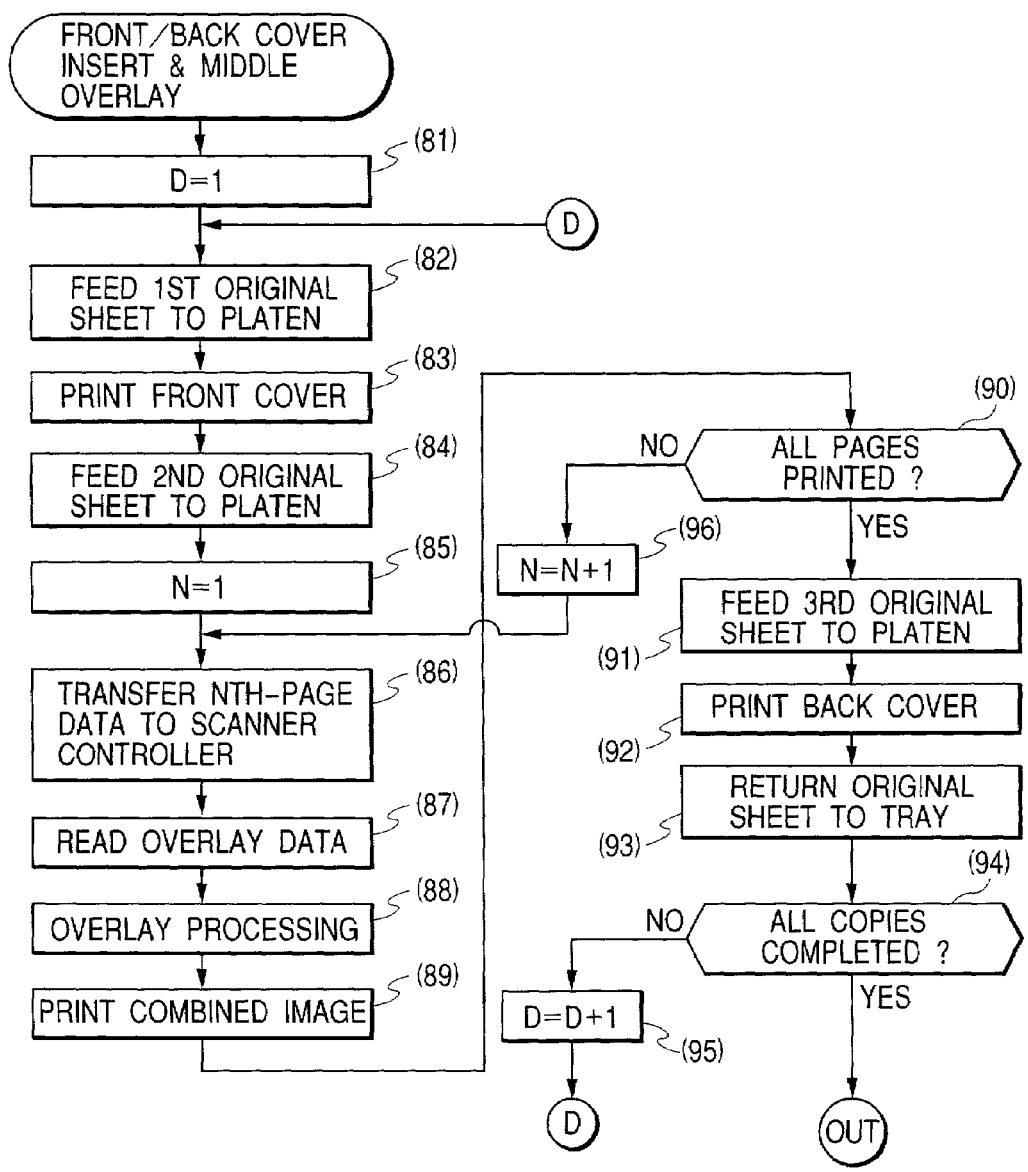
FIG. 19 is a flow chart showing an example of third data processing sequence in the image processing apparatus according to the present invention.

FIG. 19 is a flow chart showing an example of second data processing sequence in the image processing apparatus according to the present invention, which corresponds to the front/back cover insert+middle overlay mode processing sequence in the step (35) shown in FIG. 16. Incidentally, (81) to (96) show steps.

In the step (32) shown in FIG. 16, if it is judged that the selected type is the front/back cover insert+middle overlay mode as a third mode, the user sets three originals comprised of the front cover, an original to be overlay-composed with the document and the back cover on the stacking tray 1201 of the feeder 1200 of the digital copier. When the OK button BT13 on the operation panel regarding the insert/overlay original is pressed, the processing is started. Incidentally, here, while an example that the number to be overlaid is one was explained, the present invention is not limited to this number.

First of all, a number count parameter D is set to "1" (81). Then, the scanner controller 101 emits command for setting one original for forming the front cover at the exposure start position on the platen glass 1131. The feeder controller 105 feeds the original and sets the original on the platen glass in accordance with the aforementioned process (82). By the copying operation of the digital copier 1000, the front cover original set by the user is printed (83).

Then, the scanner controller 101 feeds the second original to be overlay-composed with the document onto the platen glass (84). Then, increment "1" of a page count parameter N is effected (85). The scanner controller 101 emits print execution command to the main controller 210 of the image server 200 via the digital color interface controller 790, together with the job ID designated in the job selection list, user ID and print number previously set by the user on the operation panel as parameters of command.

When the command is received, the main controller 210 of the image server 200 transfers the image data corresponding to one page to the scanner controller 101 of the digital color copier 1000, similar to the aforementioned processing (86).

In synchronous with the transferred image data of the document, the overlay original on the platen glass is read by the scanner controller 101 (87), and two synchronous originals are subjected to calculation processing in the image processor 102, and the image of the overlay original is overlaid on the document from the image server 200 (88), and, after the composition, the data is sent to the printer controller 301 to print it in accordance with the aforementioned sequence (89).

Then, it is judged whether raster images of all pages are printed (90). If NO, increment "1" of the parameter N is effected (96) and the program is returned to the step (86).

On the other hand, in the step (90), if it is judged that the print of all pages is finished, thereafter, in a step (91), the back cover original is fed by the feeder 1200 (91) and is printed (92) similar to the front cover insert. Then, the original in the feeder is returned to the start position (93).

Then, it is judged whether the above-mentioned print processing is finished by the print number designated by the user (94). If NO, increment "1" of the parameter D is effected (95) and the program is returned to the step (82).

On the other hand, in the step (94), if it is judged that the print processing is finished by the print number designated by the user, the processing is ended.

Incidentally, although not explained with reference the drawings, regarding the processing sequence of the front/back cover/reverse insert as fourth data processing sequence, the originals in which the front cover, front cover reverse, back cover reverse and back cover are overlapped in order are set on the feeder 1200, and, after the front cover and the front cover reverse are printed, the printing of the print data (document data) is effected, and, lastly, the back cover and the back cover reverse can be printed.

Incidentally, also regarding this data processing sequence, the image processing apparatus must have the function capable of printing both-faces.

In the illustrated embodiment, while an example that the digital color copier 1000 as the image processing apparatus and the image server 200 as the server device are provided independently and they are interconnected by the network to constitute the system was explained, the present invention is not limited to such a system. Namely, as mentioned above, an image processing apparatus in which the server device is incorporated into the digital color copier 1000 may be used. Incidentally, as a preferred embodiment, it is desirable that the image processing apparatus according to the present invention has the server function.

Further, in the preferred embodiment, without raster-imaging the document data each time, single raster-imaging can be effected, and any front/back cover and reverses thereof and overlay processing having different usage can be added to the document by utilizing the scanner function at any timing, thereby enhancing the pint through-put. Further, the plural parts can be printed. However, by reserving the print data in the storing means without raster-imaging thereof and by raster-imaging the print data at any timing to effect the print processing, the present invention can be carried out. Thus, the present invention is not limited.

Further, since the front cover insert and the overlay processing or the front/back cover insert and the overlay processing can be effected simultaneously as mentioned above, a system having high usability can be provided.

Next, a construction of a data processing program readable by the image processing system according to the present invention will be explained with reference to a memory map shown in FIG. 20.

FIG. 20 is a view for explaining a memory map of a recording medium for recording various data processing programs readable by the image processing system according to the present invention.

Incidentally, although not shown particularly, information (for example, version information) for managing the program group recorded on the recording medium, former name and the like are also recorded, and, information (for example, icon for discriminating and displaying the program) depending upon the OS of the program reading side may also be recorded.

Further, the data belonging to the various programs are managed by the directory. Further, when the program for installing the various programs to the computer or the program to be installed is compressed, a decompressing program may also be recorded.

In the illustrated embodiment, the functions shown in FIGS. 14 to 19 may be carried out by the host computer in accordance with the program installed externally. In this case, the present invention can be applied to a case where information group including programs is supplied to an output device by a recording medium such as CD-ROM or flash memory or FD or from an external recording medium via a network.

As mentioned above, it should be noted that the object of the present invention can be achieved by supplying a recording medium storing a program code of software for executing the functions of the above-mentioned embodiments to the system or the apparatus and by reading out and executing the program code stored in the recording medium by means of a computer (or CPU or MPU) of the system or the apparatus.

In this case, the program code itself read out from the recording medium realizes new functions of the present invention, and, thus, the recording medium storing such program code constitutes the present invention.

As the recording medium for storing the program code, for example, a floppy disk, a hard disk, an optical disk, a photo-magnetic disk, CD-ROM, CD-R, CD-RW, DVD, a magnetic tape, a non-volatile memory card, ROM or EEPROM can be used.

Further, it should be noted that the present invention includes a concept that not only the functions of the above-mentioned embodiments are realized by executing the program code read out by means of the computer, but also OS (operating system) running on the computer executes the actual processing partially or totally on the basis of instruction of the program code to realize the functions of the embodiments.

Further, it should be noted that the present invention includes a concept that, after the program code read out from the recording medium is written in a memory of a function expansion board inserted into the computer or a function expansion unit connected to the computer, a CPU of the function expansion board or of the function expansion unit executes the actual processing partially or totally on the basis of instruction of the program code to realize the functions of the embodiments.

As mentioned above, according to the illustrated embodiments, the prints in which the desired original images inputted from the scanner device are added to the desired positions of the print image data can easily be obtained by a desired number of parts for a short time.

Further, the print processing can be effected by the simple operation in which only the original image is image-inputted.

Accordingly, when the user wants the print result in which the intended original image is inserted into the print data, the original insertion processing and the print data processing can be effected separately and an image processing environment that the print result in which the original image intended by the user is inserted into the same print data can be obtained efficiently by the designated number of parts can freely be constructed.

As mentioned above, according to the image processing apparatus of the present invention, since the designation information for arranging the plural image originals read by the scanner device at the different positions of the print data is inputted and the print processing of the print data and the read plural image originals is effected, the print in which the plural image originals read by the scanner device are inserted into the different positions of the print data and are printed can easily be obtained, thereby reducing the user's working burden.

Further, according to the image processing apparatus of the present invention, since the apparatus includes first input means for inputting information for designating print data to be print-processed among the print data stored in storing means, second input means for inputting information for designating and arranging an image original read by the scanner device in a predetermined position of the print data, and print processing means for effecting print processing of the designated print data and the read image original on the basis of the informations inputted by the first and second input means, regarding the print data spooled in the memory and print-processed at any timing, the print in which the original image read by the scanner device is inserted into the predetermined position and is print-processed can easily be obtained, thereby reducing the user's working burden.

What is claimed is:

1. A printing system which enables a printing device to print data transmitted by a remote computer, said system comprising:
    a store controller unit that causes a memory unit to store print data transmitted by said remote computer;
    a user interface controller unit that causes a user interface unit of said printing device to perform display for selecting at least one of a plurality of data including the print data which has been stored in said memory unit; and
    an operation controller unit that causes said printing device to perform a first printing operation, second printing operation and a third printing operation,
    wherein the first printing operation and the third printing operation are operations for printing scan image data obtained by a scanner unit as a cover sheet,
    wherein the second printing operation is an operation for printing the print data stored in the memory unit and selected via said user interface unit,
    wherein the first printing operation, the second printing operation and the third printing operation are sequentially performed in order of the first printing operation, the second printing operation and the third printing operation, in response to a single user instruction via said user interface unit of said printing device,
    wherein the print data to be printed in the second printing operation is obtained before inputting the single user instruction and first scan image data to be printed in the first printing operation and the second scan image data to be printed in the third printing operation are obtained by using the scanner unit after inputting the single user instruction, and
    wherein a sheet subjected to printing by the second printing operation is disposed between the cover sheet subjected to printing by the first printing operation and the cover sheet subjected to printing by the third printing operation.

2. A printing system according to claim 1, wherein said store controller unit causes said memory unit to store the print data in a state of raster image data.

3. A printing system according to claim 1, wherein said user interface controller unit to display a list screen formed to be able to discriminate document names of the print data.

4. A printing system according to claim 1, wherein, the cover sheet of a front cover is subjected to printing by the first printing operation and the cover sheet of a back cover sheet is subjected to printing by the third printing operation.

5. A printing system according to claim 1, wherein said operation controller unit further causes said printing device to perform a fourth printing operation to print scan image data obtained by a scanner unit as an overlay original while the second printing operation is being performed.

6. A printing system according to claim 1, wherein the cover sheet consisting of a front cover and a front cover reverse is subjected to printing by the first printing operation and the cover sheet consisting of a back cover and a back cover reverse is subjected to printing by the third printing.

7. A printing system according to claim 1, wherein, in a case where a specific instruction is input via said user interface unit, said operation controller unit causes to delete the print data which is printed by said printing operation from said memory unit after completion of said second printing operation.

8. A controlling method of a printing system which enables a printing device to print data transmitted by a remote computer, the method comprising:
    causing a memory unit to store print data transmitted by said remote computer;
    causing a user interface unit of said printing device to perform display for selecting at least one of a plurality of data including the print data which has been stored in said memory unit; and
    causing said printing device to perform a first printing operation, a printing second operation and a third printing operation,
    wherein the first printing operation and the third printing operation are operations for printing scan image data obtained by a scanner unit as a cover sheet,
    wherein the second printing operation is an operation for printing the print data stored in the memory unit and selected via said user interface unit,
    wherein the first printing operation, the second printing operation and the third printing operation are sequentially performed in order of the first printing operation, the second printing operation and the third printing operation, in response to a single user instruction inputted said user interface unit of said printing device,
    wherein the print data to be printed in the second printing operation is obtained before inputting the single user instruction and first scan image data to be printed in the first printing operation and second scan image data to be printed in the third printing operation are obtained by using the scanner unit after inputting the single user instruction, and
    wherein a sheet subjected to printing by the second printing operation is disposed between the cover sheet subjected to printing by the first printing operation and the cover sheet subjected to printing by the third printing operation.

9. A controlling method according to claim 8, wherein said controlling method causes said memory unit to store the print in a state of raster image data.

10. A controlling method according to claim 8, wherein said controlling method causes said user interface unit to display a list screen formed to be able to discriminate document names of the print data.

11. A controlling method according to claim 8, wherein the cover sheet of a front cover is subjected to printing by the first printing operation and the cover sheet of a back cover is subjected to printing by the third printing operation.

12. A controlling method according to claim 8, further causing said printing device to perform a fourth printing operation to print scan image data obtained by a scanner unit as an overlay original while the second printing operation is being performed.

13. A controlling method according to claim 8, wherein the cover sheet consisting of a front cover and a front cover reverse is subjected to printing by the first printing operation and the cover sheet consisting of a back cover and a back cover reverse is subjected to printing by the third printing operation.

14. A controlling method according to claim 8, wherein, in a case where a specific instruction is input via said user interface unit, said controlling method causes to delete the print data which is printed by said second printing operation from said memory unit after completion of second operation.

15. A computer-readable storage medium storing a computer-executable program for executing a controlling method of a printing system which enables a printing device to print data transmitted by a remote computer, by a printing device, said method comprising:

causing a memory unit to store print data transmitted by said remote computer;

causing a user interface unit of said printing device to perform display for selecting at least one of a plurality of data including the print data which has been stored in said memory unit; and causing said printing device to perform a first printing operation, a second printing operation and a third printing operation, wherein the first printing operation and the third printing operation are operations for printing scan image data obtained by using a scanner unit as a cover sheet, wherein the second operation is an operation for printing the print data stored in the memory unit and selected via said user interface unit, wherein the first printing operation, the second printing operation and the third printing operation are sequentially performed in order of the first printing operation, the second printing operation and the third printing operation, in response to a single user instruction inputted via said user interface unit of said printing device, wherein the print data to be printed in the second printing operation is obtained before inputting the single user instruction and first scan image data to be printed in the first printing operation and second scan image data to be printed in the third printing operation are obtained by using the scanner unit after inputting the single user instruction, and wherein a sheet subjected to printing by the second printing operation is disposed between the cover sheet subjected to printing by the first printing operation and the cover sheet subjected to printing by the third printing operation.

\* \* \* \* \*